(12) United States Patent
Wang et al.

(10) Patent No.: US 11,186,753 B2
(45) Date of Patent: Nov. 30, 2021

(54) SHRINKABLE THERMOPLASTIC VULCANIZATE AND METHOD AND ARTICLE

(71) Applicant: ExxonMobil Chemical Patents Inc., Baytown, TX (US)

(72) Inventors: Wanli Wang, Katy, TX (US); Michael W. Bednarik, Fairlawn, OH (US); Peite Bao, Houston, TX (US); Yi Ping Ni, Shanghai (CN); Ying Ying Sun, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 360 days.

(21) Appl. No.: 16/334,107

(22) PCT Filed: Aug. 1, 2017

(86) PCT No.: PCT/US2017/044867
§ 371 (c)(1),
(2) Date: Mar. 18, 2019

(87) PCT Pub. No.: WO2018/057124
PCT Pub. Date: Mar. 29, 2018

(65) Prior Publication Data
US 2019/0256746 A1    Aug. 22, 2019

Related U.S. Application Data

(60) Provisional application No. 62/399,080, filed on Sep. 23, 2016.

(51) Int. Cl.
*C08L 23/16* (2006.01)
*C09J 123/16* (2006.01)
(Continued)

(52) U.S. Cl.
CPC ........... *C09J 123/16* (2013.01); *B29C 61/003* (2013.01); *B29C 61/025* (2013.01); *B29C 65/68* (2013.01);
(Continued)

(58) Field of Classification Search
CPC ......... C09J 123/16; C09J 5/06; B29C 61/025; B29C 65/68; C08J 3/266; C08L 23/16
See application file for complete search history.

(56) References Cited

U.S. PATENT DOCUMENTS 4,311,628 A   1/1982   Abdou-Sabet et al.
5,157,081 A   10/1992  Puydak et al.
(Continued)

FOREIGN PATENT DOCUMENTS

EP    0 357 322       3/1990
WO    2009/020720     2/2009

*Primary Examiner* — Jeffry H Aftergut
*Assistant Examiner* — Jaeyun Lee

(57) ABSTRACT

A process of heat shrinking an article is provided. The process includes shaping a thermoplastic vulcanizate (TPV) into an article, the TPV having: a partially vulcanized rubber dispersed in a continuous thermoplastic phase, wherein more than 5 wt % of the rubber is extractable in boiling xylene, and wherein the thermoplastic phase comprises a thermoplastic resin having a Tm>110° C. and a propylene-based elastomer (PBE) having a Tm<110° C.; and heating the article to a temperature between about 100° C. and 250° C. to shrink the article.

16 Claims, 11 Drawing Sheets

| | Example 1 | | | | | Comparative Example 1 | | | | |
|---|---|---|---|---|---|---|---|---|---|---|
| | Length | | Width | | Weight | Length | | Width | | Weight |
| | mm | Change (%) | mm | Change (%) | Change (%) | mm | Change (%) | mm | Change (%) | Change (%) |
| Original size | 124 | - | 75.5 | - | | 123.3 | - | 75 | - | |
| 100 °C | 122 | 1.6 | 75.5 | 0.0 | -0.02 | - | - | - | - | - |
| 130 °C | 118 | 4.8 | 75 | 0.7 | 0.14 | - | - | - | - | - |
| 140 °C | 116 | 6.5 | 76.5 | 1.3 | -0.03 | - | - | - | - | - |
| 150 °C | 113 | 8.9 | 76.8 | 1.7 | -0.03 | 123 | 0.4 | 75.5 | 0.6 | -0.02 |

(51) Int. Cl.
  *B29C 61/00* (2006.01)
  *B29C 61/02* (2006.01)
  *B29C 65/68* (2006.01)
  *C08J 3/22* (2006.01)
  *C09J 5/06* (2006.01)
  *B29K 21/00* (2006.01)

(52) U.S. Cl.
  CPC ............... C08J 3/226 (2013.01); C08L 23/16 (2013.01); C09J 5/06 (2013.01); *B29K 2021/003* (2013.01); *C08L 2203/30* (2013.01); *C08L 2205/025* (2013.01); *C08L 2205/035* (2013.01); *C08L 2310/00* (2013.01); *C09J 2423/10* (2013.01); *C09J 2423/16* (2013.01); *C09J 2461/00* (2013.01); *C09J 2491/00* (2013.01)

(56) References Cited

U.S. PATENT DOCUMENTS

| | | | |
|---|---|---|---|
| 6,121,383 | A | 9/2000 | Abdou-Sabet et al. |
| 6,288,171 | B2 | 9/2001 | Finerman et al. |
| 7,008,699 | B2 | 3/2006 | Jourdian et al. |
| 2003/0134062 | A1* | 7/2003 | Rajan ...................... B32B 27/08 428/34.9 |
| 2009/0283294 | A1* | 11/2009 | Bukovnik .......... H02G 15/1806 174/102 R |
| 2016/0340480 | A1* | 11/2016 | Kerstetter, III ......... C08L 23/16 |
| 2017/0015028 | A1* | 1/2017 | Lee ........................ F16F 1/024 |

\* cited by examiner

| | Example 1 | | | | | | Comparative Example 1 | | | | | |
|---|---|---|---|---|---|---|---|---|---|---|---|---|
| | Length | | Width | | Weight | | Length | | Width | | Weight | |
| | mm | Change (%) | mm | Change (%) | | Change (%) | mm | Change (%) | mm | Change (%) | | Change (%) |
| Original size | 124 | - | 75.5 | - | | | 123.5 | - | 75 | - | | |
| 100 °C | 122 | 1.6 | 75.5 | 0.0 | | -0.02 | - | - | - | - | | - |
| 130 °C | 118 | 4.8 | 76 | 0.7 | | 0.14 | - | - | - | - | | - |
| 140 °C | 116 | 6.5 | 76.5 | 1.3 | | -0.03 | - | - | - | - | | - |
| 150 °C | 113 | 8.9 | 76.8 | 1.7 | | -0.03 | 123 | 0.4 | 75.5 | 0.6 | | -0.02 |

SHRINKABLE THERMOPLASTIC VULCANIZATE AND METHOD AND ARTICLE

CROSS-REFERENCE OF RELATED APPLICATIONS

Priority Claim

This application is a National Phase Application claiming priority to PCT Application Serial No. PCT/US2017/044867 filed Aug. 1, 2017, which claims priority to U.S. Provisional Application No. 62/399,080 filed Sep. 23, 2016, the disclosure of which are incorporated herein by reference.

FIELD OF THE INVENTION

The invention relates to novel shrink methods and products, and, more particularly, methods and products of a thermoplastic vulcanizate having improved shrinkage and bonding properties.

BACKGROUND OF THE INVENTION

Thermoplastic vulcanizates (TPVs) are a diverse family of rubber-like materials that exhibit properties of both thermoset rubbers and thermoplastic materials. TPVs show superior aging performance and chemical resistance like thermosets but are easily processed and recyclable within the manufacturing process like thermoplastics. TPVs are generally fully dynamically vulcanized ethylene propylene diene terpolymer (EPDM) rubber in a thermoplastic matrix of polypropylene (PP) such that the TPV looks, feels and behaves like rubber but, due to the PP content, offers simple, flexible part design and manufacturing.

U.S. Pat. No. 7,008,699 describes multicomponent thermoset structures including a first polymer structure made of an EPDM adhered to a second polymer structure made of a blend of dynamically vulcanized EPDM dispersed in a matrix of a thermoplastic polyolefin polymer. The first or both of the first and second polymer structures may be blended with a semicrystalline random adhesive copolymer.

U.S. Pat. No. 6,288,171 describes TPVs modified by random propylene copolymers to increase the elongation to break and toughness of the TPV. It is disclosed that the elongation to break is controlled by compatibility of the two phases, phase sizes, and added compatibilizers while the shore A/D hardness of the TPV is generally controlled by the ratio of the harder thermoplastic phase to the softer rubber phase. The TPV is disclosed to comprise a rubber portion and blend of a semi-crystalline isotactic polypropylene and a random isotactic propylene copolymer modifier.

SUMMARY OF THE INVENTION

The invention relates to novel shrink methods and products, and, more particularly, methods and products of a thermoplastic vulcanizate having improved shrinkage and bonding properties.

In some aspects, a process for heat shrinking an article is provided. The process includes (a) shaping a thermoplastic vulcanizate (TPV) into an article, the TPV having: a partially vulcanized rubber dispersed in a continuous thermoplastic phase, wherein more than 5 wt % of the rubber is extractable in boiling xylene, and wherein the thermoplastic phase comprises: (i) a thermoplastic resin having a Tm>110° C.; (ii) a propylene-based elastomer (PBE) having a Tm<110° C.; and (b) heating the article to a temperature between about 100° C. and 250° C. so as to shrink at least a portion of the article.

Processes according to other aspects include (a) shaping a TPV into an article, the TPV having: a partially vulcanized rubber dispersed in a continuous thermoplastic phase, wherein more than 5 wt % of the rubber is extractable in boiling xylene, and wherein the thermoplastic phase comprises a thermoplastic resin; and (b) heating the article to a temperature between about 100° C. and 250° C. so as to shrink at least a portion of the article.

Processes according to yet further aspects include (a) shaping a TPV into an article, the TPV having: an at least partially vulcanized rubber dispersed in a continuous thermoplastic phase, wherein the thermoplastic phase comprises: (i) a thermoplastic resin having a Tm>110° C.; and (ii) a PBE having a Tm<110° C.; and heating the article to a temperature between about 100° C. and 250° C. to shrink at least a portion of the article.

DETAILED DESCRIPTION

Figures 1, 2:
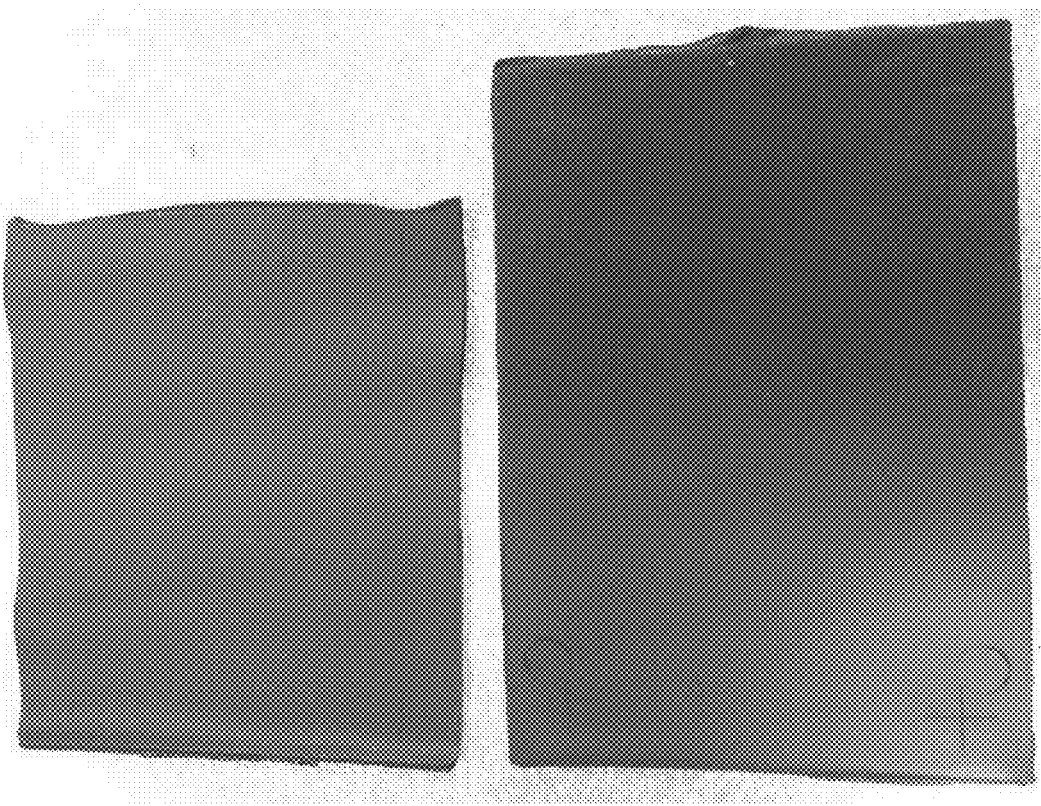
FIG. 1 is a table showing length, width, and weight change of Example 1 and Comparative Example 1 for heat aging for 2 minutes at designated temperatures.
FIG. 2 shows the ISO sample plaque for Example 1 before and after heat aging.

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

Definitions

As used herein, a "thermoplastic vulcanizate" or "TPV" is broadly defined as any material that includes a dispersed, at least partially vulcanized, or fully vulcanized, rubber within a thermoplastic resin. A TPV composition can further include oil, additives, and combinations thereof.

As used herein, the term "vulcanizate" means a composition that includes some component (e.g., rubber) that has been vulcanized. The term "vulcanized" is defined herein in its broadest sense, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." In at least that context, the term vulcanization encompasses any form of curing (crosslinking), both thermal and chemical, which can be utilized in dynamic vulcanization.

As used herein, the term "dynamic vulcanization" means vulcanization or curing of a curable rubber blended with a thermoplastic resin under conditions of shear at temperatures sufficient to plasticize the mixture. In preferred embodiments, the rubber is simultaneously crosslinked and dispersed within the thermoplastic resin. Depending on the degree of cure, the rubber to thermoplastic resin ratio, compatibility of the rubber and thermoplastic resin, the kneader type and the intensity of mixing (shear rate), other morphologies, such as co-continuous rubber phases in the plastic matrix, are possible.

Preferably, the percent of soluble rubber in the cured or vulcanized composition is determined by refluxing a specimen in boiling xylene, weighing the dried residue and making suitable corrections for soluble and insoluble components based upon knowledge of the composition. Thus, corrected initial and final weights are obtained by subtracting from the initial weight of the soluble components, other than the rubber to be vulcanized, such as extender oils, plasticizers, and components of the compositions soluble in organic solvent, as well as thermoplastic components that are not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition. A further description of the technique for determining the percentage of extractable rubber is set forth in U.S. Pat. No. 4,311,628, and the portions of the patents referring to that technique are hereby incorporated by reference.

As used herein, a "partially vulcanized" rubber is one wherein more than 5 weight percent (wt %) of the crosslinkable rubber is extractable in boiling xylene, subsequent to vulcanization (preferably dynamic vulcanization), e.g., crosslinking of the rubber phase of the TPV. For example, in a TPV comprising a partially vulcanized rubber at least 5 wt %, or 10 wt %, or 15 wt % and less than 20 wt %, or 30 wt %, or 50 wt % (in varying embodiments) of the crosslinkable rubber can be extractable from the specimen of the TPV in boiling xylene.

As used herein, a "fully vulcanized" (or fully cured or fully crosslinked) rubber is one wherein less than 5 wt % of the crosslinkable rubber is extractable in boiling xylene, subsequent to vulcanization (preferably dynamic vulcanization), e.g., crosslinking of the rubber phase of the TPV. For example, in a TPV comprising a fully vulcanized rubber less than 4 wt %, or less than 3 wt %, or less than 2 wt %, or less than 1 wt % of the crosslinkable rubber can be extractable from the specimen of the TPV in boiling xylene. In some embodiments, in a TPV comprising a fully vulcanized rubber, from 0.5 to 2.0 wt % of the crosslinkable rubber is extractable from the specimen of the TPV in boiling xylene. Thus, TPVs according to various embodiments may have less than 20, 15, 10, 5, 4, 3, 2, or even 1 wt % of crosslinkable rubber extractable in boiling xylene from a specimen of the TPV, and at least 0.0, 0.1, or 0.5 wt % rubber extractable in boiling xylene.

As used herein "phr" means parts per hundred parts of rubber. Thus, for example, a TPV that comprises 10 phr of an additive contains 10 parts by weight of the additive per 100 parts by weight of the rubber in the TPV.

As used herein, the phrases "substantially no," and "substantially free of" are intended to mean that the subject item is not intentionally used or added in any amount, but may be present in very small amounts existing as impurities resulting from environmental or process conditions.

As used herein, a "machine direction" means a direction of the formed article that is parallel or substantially parallel to a direction of polymer chains elongated due to machine processing, for example, extrusion of or pulling of the polymer upon exiting a die. "Cross direction" or "transverse direction" means a direction generally or substantially perpendicular to the machine direction. For example, when the product is a tube formed by melt extruding, the machine direction of the product is an axial direction parallel to an axis of the tube product, and the transverse direction may be a radial or circumferential direction of the tube product. However, if the tube is formed from a plaque or film such that ends of the plaque or film are joined, the machine direction may be the radial or circumferential direction while the transverse direction is the axial direction of the tube.

Rubber Component

The TPV's described herein comprise a rubber component. The "rubber component" can be any material that is considered by persons skilled in the art to be a "rubber", preferably a crosslinkable rubber (i.e., prior to vulcanization) or crosslinked rubber (i.e., after vulcanization). The rubber component may comprise or consist of one rubber, or it may comprise or consist of a blend of two or more rubbers, where the rubbers are different in composition or are the same in composition but have different properties.

Non-limiting examples of useful rubbers include olefin-containing rubbers, butyl rubber, natural rubber, styrene-butadiene copolymer rubber, butadiene rubber, acrylonitrile rubber, halogenated rubbers such as brominated and chlorinated isobutylene-isoprene copolymer rubber, butadiene-styrene-vinyl pyridine rubber, urethane rubber, polyisoprene rubber, epichlorohydrin terpolymer rubber, polychloroprene rubber, and mixtures thereof.

In preferred embodiments, the rubber is an olefin-containing rubber, such as an ethylene-α-olefin copolymer rubber, such as an ethylene-α-olefin-diene rubber (e.g., the rubber component consists of such ethylene-α-olefin or such ethylene-α-olefin-diene rubber). The ethylene-α-olefin copolymer rubber of some embodiments may comprise at least 50, 55, or 60 wt % ethylene-derived units; with the balance of the units derived from one or more C3-C8 α-olefins (preferably derived from propylene).

In preferred embodiments, the rubber component comprises or consists of an ethylene-α-olefin-polyene (e.g.; an ethylene-α-olefin-diene) rubber. The ethylene-α-olefin-polyene rubber may likewise comprise a C3-C8 α-olefin (e.g., propylene in preferred embodiments, in which the rubber may be characterized as an ethylene-propylene-diene rubber ("EPDM")). Preferably the polyene in the ethylene-α-olefin-diene rubber is a nonconjugated polyene, and in particular a nonconjugated diene. Suitable non-conjugated polyenes include any polyene described in Paragraph [220] of U.S. Patent Publication No. 2015/0025209 (the description of which is incorporated herein by reference), with 5-ethylidene-2-norbornene (ENB) and/or 5-vinyl-2-norbornene particularly (VNB) preferred, and ENB particularly preferred.

Suitable ethylene-α-olefin-diene rubbers may contain from 20 to 80 wt % ethylene-derived units, preferably from 45 to 70 (such as 45 to 60 or 50 to 60) wt % ethylene-derived units; and from 0.01 to 10 wt % (preferably 0.01, 0.05, 0.1, 3, or 4 wt % to 6, 7, 8, 9, or 10 wt %) diene-derived units (preferably ENB-derived units). Ranges of ethylene or diene content from any one of the foregoing low ends to any of the foregoing high ends are also contemplated in various embodiments. The remainder of such rubbers comprises units derived from the one or more C3-C8 α-olefins (preferably derived from propylene).

Ethylene content is determined using FTIR according to ASTM D3900. ENB content, if any, is determined using FTIR according to ASTM D6047. The content of other diene, if present, can be obtained using C13 NMR. Ethylene content determined according to ASTM D3900 is corrected for diene content (where dienes are present), calculated as follows:

(% C2(uncorr)/(100+% diene)*100).

The ethylene-α-olefin rubber or the ethylene-α-olefin-diene rubber may have a weight average molecular weight (Mw) that is greater than 100,000 g/mole, or greater than 200,000 g/mole; or greater than 400,000 g/mole, or greater than 600,000 g/mole. The Mw of the ethylene-α-olefin rubber or the ethylene-α-olefin-diene rubber may be less than 1,200,000 g/mole, or less than 1,000,000 gr/mole, or less than 900,000 g/mole, or less than 800,000 g/mole. Useful ethylene-α-olefin rubbers and ethylene-α-olefin-diene rubbers may have a number average molecular weight (Mn) that is greater than 20,000 g/mole, or greater than 60,000 g/mole, or greater than 100,000 g/mole, or greater than 150,000 g/mole. The Mn of the ethylene-α-olefin rubber or the ethylene-α-olefin-diene rubber may be less than 500,000 g/mole, or less than 400,000 g/mole, or less than 300,000 g/mole, or less than 250,000 g/mole. Techniques for determining the molecular weight (Mn, Mw, and Mz) and molecular weight distribution (MWD) may be found in U.S. Pat. No. 4,540,753, which is incorporated by reference herein, and references cited therein and in Macromolecules, 1988, volume 21, p. 3360 by Ver Strate et al., which is also herein incorporated by reference, and references cited therein.

The ethylene-α-olefin rubber or the ethylene-α-olefin-diene rubber may also or instead be characterized by having a Mooney viscosity (ML(1+4) at 125° C.) per ASTM D-1646, of from about 10 to about 250, or from about 20 to about 100, or from about 30 to about 75, or from about 40 to about 60, where desirable ranges may include ranges from any lower limit to any upper limit. As used herein, Mooney viscosity is reported using the format: Rotor ([pre-heat time in minutes]+[shearing time in minutes] @ measurement temperature in ° C.), such that ML (1+4@125° C.) indicates a Mooney viscosity determined using the ML or large rotor according to ASTM D1646-99, for a pre-heat time of 1 minute and a shear time of 4 minutes, at a temperature of 125° C. In some embodiments, the ethylene-α-olefin rubber or the ethylene-α-olefin-diene rubber is oil extended and the Mooney viscosity of the oil-extended rubber is from about 10 to about 250, or from about 20 to about 100, or from about 30 to about 75, or from about 40 to about 60, where desirable ranges may include ranges from any lower limit to any upper limit.

The ethylene-α-olefin rubber or the ethylene-α-olefin-diene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g, where desirable ranges may include ranges from any lower limit to any upper limit.

The ethylene-α-olefin rubber or the ethylene-α-olefin-diene rubber may be characterized by a glass transition temperature (Tg), as determined by Differential Scanning calorimetry (DSC) according to ASTM E-1356, that is less than −20° C., or less than −30° C., or less than −50° C., or from about −20 to about −60° C.

The ethylene-α-olefin and the ethylene-α-olefin-diene rubbers described herein may be manufactured or synthesized by using a variety of techniques. For example, these copolymers can be synthesized by employing solution, slurry, or gas phase polymerization techniques that employ various catalyst systems. Exemplary catalysts include Ziegler-Natta systems such as those including vanadium catalysts, and single-site catalysts including constrained geometry catalysts, or metallocene catalysts. Useful ethylene-α-olefin rubbers and ethylene-α-olefin-diene rubbers include some grades of rubbers commercially available under the tradenames Vistalon™ (ExxonMobil Chemical Co.; Houston, Tex.), Keltan™ (DSM Copolymers), Nordel™ IP (Dow), Nordel™ MG (Dow), Royalene™ (Lion Copolymer), and Buna™ (Lanxess).

The rubber component may be present in the TPV in an amount of from a low of about 10 wt %, 15 wt %, 20 wt %, or 25 wt % to a high of about 30 wt %, 35 wt %, 40 wt %, or 45 wt % based on total weight of the TPV composition, where desirable ranges may include ranges from any lower limit to any upper limit. These wt % s are of the rubber component exclusive of any extender oil that may optionally be included in the rubber component.

Alternatively, the rubber content of some embodiments may be characterized in terms of the polymer content of the TPV. That is, the rubber component may be present in the TPV in an amount of from a low of about 40 wt %, 45 wt %, or 50 wt % to a high of about 65 wt %, 70, wt %, 75 wt %, based on the total weight of: (i) rubber component; and (ii) thermoplastic component (which in turn consists of thermoplastic resin(s) and/or PBE, as detailed below) in the TPV (again, exclusive of any extender oil that may be present in the rubber component). Desirable ranges may include ranges from any lower limit to any upper limit.

Thermoplastic Component

The TPVs described herein comprise a thermoplastic component comprising a thermoplastic resin and, in some embodiments, further comprising a PBE. The thermoplastic component may be present in the TPV composition in an amount of from a low of 5 wt %, 7 wt %, 10 wt %, 12 wt %, or 15 wt %, to a high of about 23 wt %, 25 wt %, 27 wt %, 30 wt %, or 35 wt %, based on total weight of the TPV composition, where desirable ranges may include ranges from any lower limit to any upper limit.

Alternatively, the amount of thermoplastic component in the TPV may be characterized based only on the combined amount of rubber component and thermoplastic component. That is, the thermoplastic component may be present in the TPV in an amount of from a low of about 25 wt %, 30 wt %, or 35 wt % to a high of about 50 wt %, 54 wt %, or 40 wt %, based on the total weight of: (i) rubber component; and (ii) thermoplastic component in the TPV, where desirable ranges may include ranges from any lower limit to any upper limit.

As described above, the thermoplastic component comprises thermoplastic resin and, in some embodiments, PBE. In some embodiments the polymer content of the thermoplastic component consists essentially of, or consists only of: (i) thermoplastic resin; (ii) PBE; or (iii) thermoplastic resin and PBE.

In embodiments in which the thermoplastic component comprises a PBE, the TPV may contain the PBE in an amount of from a low of 1, 2, 3, 4, or 5 wt % to a high of 3, 4, 5, 6, 7, 8, or 9 wt %, provided the high end of the range is greater than the low end. The wt % is based on the weight of the TPV, and desirable ranges may include ranges from any lower limit to any upper limit, in some embodiments, the TPV may contain about 2 wt %, or about 4 wt %, or about 6 wt %, or about 8 wt % of the PBE, based on the weight of the TPV.

Alternatively, in terms of weight of the thermoplastic component, the PBE may be present in an amount of from a low of about 5, 7, 8, 9, 10, 11 12, 15, 20, 25, 30, or 35 wt % to a high of about 13, 15, 17, 20, 25, 27, 30, 33, 35, 37, 40, 43, or 45 wt % (provided that the high end of the range is greater than the low end). The wt % s are based on the weight of the thermoplastic component (e.g., the thermoplastic resin and the PBE), and desirable ranges may include ranges from any lower limit to any upper limit. Thus, exemplary ranges include 8 to 15 wt %, 12 to 20 wt %, 20 to 27 wt %, 20 to 30 wt %, 15 to 45 wt %, 30 to 45 wt %, and so on.

The TPV may contain the thermoplastic resin in an amount of from a low of about 10, 11, 12, 13, 14, 15, or 16 wt % to a high of about 16, 17, 18, 19, 20, 21, 22, or 25 wt %. The wt % is based on the weight of the TPV, and desirable ranges may include ranges from any lower limit to any upper limit.

Alternatively, in terms of weight of the thermoplastic component, the thermoplastic resin may be present in an amount within the range from a low of about 50, 51, 52, 53, 54, 55, 60, 65, 70, or 75 wt % to a high of about 55, 60, 65, 70, 75, 80, 85, 86, 87, 88, 89, or 90 wt % (provided that the high end of the range is greater than the low end). The wt % s are based on the total weight of the thermoplastic component in the TPV, and desirable ranges may include ranges from any lower limit to any upper limit. Exemplary ranges therefore include 50-60 wt %, 55-75 wt %, 60-90 wt %, 60-70 wt %, and so on.

Thermoplastic Resin

The thermoplastic component of the TPV includes at least one olefinic thermoplastic resin. The "olefinic thermoplastic resin" may be any thermoplastic polyolefin material that is not a "rubber" and is not a "propylene-based elastomer" as described herein. For example, the thermoplastic resin may be a polymer or polymer blend considered by persons skilled in the art as being thermoplastic in nature, e.g., a polymer that softens when exposed to heat and returns to its original condition when cooled to room temperature. The olefinic thermoplastic resin component may contain one or more polyolefins, including polyolefin homopolymers and poly-olefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins may be prepared from C2 to C7 α-olefins, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non cross-linked.

In some preferred embodiments, the olefinic thermoplastic resin comprises, or consists of, polypropylene. The term "polypropylene" as used herein broadly means any polymer that is considered a "polypropylene" by persons skilled in the art and includes homo, impact, and random copolymers of propylene. Preferably, the polypropylene used in the compositions described herein has a melting point (Tm) above 110° C. and includes at least 90 wt % propylene-derived units. The polypropylene may also include isotactic, atactic or syndiotactic sequences, and preferably includes isotactic sequences. The polypropylene can either derive exclusively from propylene monomers having only propylene-derived units) or comprises at least 90 wt %, or at least 93 wt %, or at least 95 wt %, or at least 97 wt %, or at least 98 wt %, or at least 99 wt % propylene-derived units, with the remainder derived from olefins, such as ethylene, and/or C4-C10 α-olefins.

In yet other embodiments, the olefin thermoplastic resin may comprise or consist of a random propylene-based terpolymer comprising units derived from propylene and two other C2 or C4-C8 α-olefins. Preferably, one of the other α-olefins is ethylene. In certain embodiments, the other of the α-olefins is 1-butene or 1-octene, preferably 1-butene. Thus, terpolymers of some embodiments include a random terpolymer of propylene, ethylene, and 1-butene. The propylene-derived content of such terpolymers is preferably within the range from 75 to 99, such as 80 to 95, or 85 to 9.5 wt %, with ranges from any low end to any high end also contemplated. Similarly, ethylene-derived content of such terpolymers may be within the range from 1 to 10 wt %, such as 1 to 7, or 3 to 5 wt % (again, with ranges from any low end to any high end also contemplated). And, the final α-olefin-derived content (e.g., 1-octene or, preferably, 1-butene) may be within the range from 3 to 10, such as 4 to 8 or 5 to 7 wt % (once more with ranges from any low end to any high end also contemplated). The just-noted wt % s are based on total weight of the terpolymer.

The olefinic thermoplastic resin may have a melting temperature (Tin) of at least 110, 120, or 130° C. in some embodiments, Tm of the thermoplastic resin may be within the range from 110, 120, or 130 to 170, 180, 190, 200, 250, or 300° C. on the high end.

As used herein, DSC procedures for determining Tm and Hf are as follows. The polymer is pressed at a temperature of from about 200° C. to about 230° C. in a heated press, and the resulting polymer sheet is hung in the air (ambient temperature 20-25° C.) to cool. A punch die is used to remove a 6 to 10 mg sample from the sheet, which sample is annealed at about 23-25° C. for 80 to 100 hours. At the end of this period, the sample is placed in a DSC (Perkin Elmer Pyris One Thermal Analysis System or equivalent) and cooled at a rate of 10° C./min to a temperature between −30° C. and −50° C., and held for 10 minutes within that temperature range. The sample is then heated at 10° C./min to attain a final temperature of 200° C. The sample is kept at 200° C. for 5 minutes. Then a second cool-heat cycle is performed, where the sample is again cooled at a rate of 10° C./min to −30° C. to −50° C. and held for 10 minutes within that temperature range, and then re-heated at 10° C./min to a final temperature of 200° C. Events from both cycles are recorded. The thermal output is recorded as the area under the melting peak of the sample, which typically occurs between about 0° C. and about 200° C. It is measured in Joules and is a measure of the Hf of the polymer. The melting peak is recorded as the Tm. Where more than one melting peak may be present, the highest peak is taken as the Tm.

Using the DSC test method described herein, the melting temperature is the temperature recorded corresponding to the greatest heat absorption within the range of melting temperature of the sample. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers (such as the PBEs described below) are commonly found, the melting point peak may be at a low temperature and be relatively flat, making it difficult to determine the precise peak location. A "peak" in this context is thus defined as a change in the general slope of the DSC curve (heat flow versus temperature) from positive to negative, forming a maximum without a shift in the baseline where the DSC curve is plotted so that an endothermic reaction would be shown with a positive peak.

The thermoplastic resin may have a melt flow rate ("MFR") as measured by ASTM D1238 at 230° C. and 2.16 kg weight of from about 0.1 to 100 g/10 min. In preferred embodiments, the TPV comprises at least one thermoplastic resin having a fractional MFR, such a polypropylene having a fractional MFR of less than about 2 g/10 min, or less than about 1.5 g/10 min, or less than about 1 g/10 min. The TPV may also comprise a thermoplastic resin, such as a polypropylene, having a MFR of from a low of about 25, 26, 27, 28, 29, 30, 31, 32, or 33 g/10 min to a high of about 37, 38, 39, 40, 41, 42, 43, 44, or 45 g/10 min, where desirable ranges may include ranges from any lower limit to any upper limit. In some embodiments, the TPV may further comprise a thermoplastic resin, such as a polypropylene, having a MFR of from a low of about 5, 10, or 15 g/10 min to a high of about 20, 25, or 30 g/10 min, where desirable ranges may include ranges from any lower limit to any upper limit, Propylene-Based Elastomer The thermoplastic component of the TPVs described herein comprises one or more propylene-based polymers, such as propylene-based elastomers ("PBEs"). The PBE comprises about 70 to about 95 wt % propylene and from about 5 to about 30 wt % of one or more comonomers selected from ethylene and/or C4-C12 α-olefins. For example, the comonomer units may be derived from ethylene, butene, pentene, hexene, 4-methyl-1-pentene, octene, or decene. In preferred embodiments, the comonomer is ethylene. In some embodiments, the PBE consists essentially of propylene and ethylene, or consists only of propylene and ethylene. For example, the PBE may comprise, consist essentially of, or consist only of about 70 to about 95 wt % units derived from propylene and about 5 to about 30 wt % units derived from ethylene. Some of the embodiments described below are discussed with reference to ethylene as the comonomer, but the embodiments are equally applicable to PBEs with other α-olefin comonomers. In this regard, the copolymers may simply be referred to as PBEs with reference to ethylene as the α-olefin.

The PBE may include at least about 5 wt %, at least about 6 wt %, at least about 7 wt %, at least about 8 wt %, at least about 9 wt %, or at least about 10 wt %, α-olefin-derived units, based upon the total weight of the PBE. The PBE may include up to about 25 wt %, up to about 22 wt %, up to about 20 wt %, up to about 17 wt %, up to about 15 wt %, up to about 13 wt %, or up to about 12 wt %, α-olefin-derived units, based upon the total weight of the PBE. In some embodiments, the PBE may comprise from about 5 to about 25 wt %, from about 6 to about 22 wt %, from about 7 wt % to about 20 wt %, from about 8 to about 17 wt %, from about 9 wt % to about 15 wt %, from about 9 wt % to about 13 wt %, or from about 10 to about 12 wt %, α-olefin-derived units, based upon the total weight of the PBE.

The PBE may include at least about 75 wt %, at least about 78 wt %, at least about 80 wt %, at least about 83 wt %, at least about 85 wt %, at least about 87 wt %, or at least about 88 wt %, propylene-derived units, based upon the total weight of the PBE. The PBE may include up to about 95 wt %, up to about 94 wt %, up to about 93 wt %, up to about 92 wt %, up to about 91 wt %, or up to about 90 wt %, propylene-derived units, based upon the total weight of the PBE.

The PBE can be characterized by a melting temperature (Tm), which can be determined by differential scanning calorimetry (DSC), as described previously.

The Tm of the PBE (as determined by DSC) may be less than about 110° C., less than about 100° C., less than about 90° C., less than about 80° C., less than about 70° C., less than about 65° C., less than about 60° C. The PBE may have a Tm of from about 20 to about 90° C. from about 30 to about 80° C., from about 40 to about 70° C., or from about 50 to about 65° C., where desirable ranges may include ranges from any lower limit to any upper limit, in some embodiments, the PBE may have a Tm of from about 55 to about 70° C., or from about 57 to about 68° C., or from about 60 to about 65° C., where desirable ranges may include ranges from any lower limit to any upper limit. In some embodiments, the PBE may have a Tm of from about 45 to about 65° C., or from about 50 to about 60° C., or from about 52 to about 58° C., where desirable ranges may include ranges from any lower limit to any upper limit.

The PBE can be characterized by its heat of fusion (Hf), as determined by DSC. The PBE may have an Hf that is at least about 1.0 J/g, at least about 3.0 J/g, at least about 5.0 J/g, at least about 7.0 J/g, at least about 10.0 J/g, at least about 12 J/g, at least about 15 J/g, at least about 20 J/g, or at least about 25 J/g. The PBE may be characterized by an Hf of less than about 60 J/g, less than about 50 J/g, less than about 40 J/g, less than about 35 J/g, less than about 30 J/g, less than about 25 J/g, less than about 20 J/g, less than about 15 J/g. The PBE may have a Hf of from about 1.0 to about 50 J/g, or from about 3.0 to about 40 J/g, or from about 5.0 to about 35 J/g, or from about 10.0 to about 30 J/g, where desirable ranges may include ranges from any lower limit to any upper limit. In some embodiments, the PBE may have a Hf of from about 1.0 to about 25 J/g, from about 5.0 to about 20 J/g, from about 10 to 20 J/g, or from about 12 to about 18 J/g, where desirable ranges may include ranges from any lower limit to any upper limit. In some embodiments, the PBE may have a Hf of from 5.0 to about 40 J/g, from about 10.0 to about 35 J/g, from about 15 to about 35 J/g, or from about 20 to about 30 J/g, or from about 25 to about 30 J/g, where desirable ranges may include ranges from any lower limit to any upper limit.

Preferably, the PBE has crystalline regions interrupted by non-crystalline regions. The non-crystalline regions can result from regions of non-crystallizable propylene segments, the inclusion of comonomer units, or both. In one or more embodiments, the PBE has a propylene-derived crystallinity that is isotactic, syndiotactic, or a combination thereof. In a preferred embodiment, the PBE has isotactic sequences. The presence of isotactic sequences can be determined by NMR measurements showing two or more propylene derived units arranged isotactically. Such isotactic sequences can, in some cases be interrupted by propylene units that are not isotactically arranged or by other monomers that otherwise disturb the crystallinity derived from the isotactic sequences.

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, from about 80 to about 99%, from about 85 to about 99%, from about 90 to about 99%, from about 90 to about 97%, or from about 80 to about 97%, where desirable ranges may include ranges from any lower limit to any upper limit. Triad tacticity may be determined by the methods described in U.S. Pat. No. 7,232,871.

The PBE may have a percent crystallinity determined according to DSC procedures of from about 0.5% to about 40%, from about 1% to about 30%, or from about 5% to about 25%, where desirable ranges may include ranges from any lower limit to any upper limit. Crystallinity may be determined by dividing the Hf of a sample by the Hf of a 100% crystalline polymer, which is assumed to be 189 J/g for isotactic polypropylene.

The comonomer content and sequence distribution of the polymers can be measured using 13C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Volume 47, pp. 1128-1130. For a propylene ethylene copolymer containing greater than 75 wt % propylene, the comonomer content (ethylene content) of such a polymer can be measured as follows: A thin homogeneous film is pressed at a temperature of about 1.50° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

The PBE has a density of from about 0.84 g/cm3 to about 0.92 g/cm3, from about 0.85 g/cm3 to about 0.90 g/cm3, or from about 0.86 g/cm3 to about 0.88 g/cm3 at room temperature, as measured per the ASTM D-1505 test method, where desirable ranges may include ranges from any lower limit to any upper limit.

The PBE can have a melt index (MI) (ASTM D-1238, 2.16 kg @ 190° C.), of less than or equal to about 25 g/10 min, less than or equal to about 10 g/10 min, less than or equal to about 8.0 g/10 min, less than or equal to about 5.0 g/10 min, or less than or equal to about 2.0 g/10 min. In some embodiments, the PBE has a MI of from about 0.5 to about 3.0 g/10 min or from about 0.75 to about 2.0 g/10 min, where desirable ranges may include ranges from any lower limit to any upper limit. In some embodiments, the PBE has a. MI of from about 1.0 to about 8.0 g/10 min, or from about 2.0 to about 6.0 g/10 min, or from about 2.5 to about 5.0 g/10 min, where desirable ranges may include ranges from any lower limit to any upper limit.

The PBE may have a melt flow rate (MFR), as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, or greater than about 2.5 g/10 min. The PBE may have an MFR less than about 25 g/10 min, less than about 15 g/10 min, less than about 10 g/10 min, less than about 7 g/10 min, or less than about 5 g/10 min. The PBE may have an MFR from about 0.5 to about 15 g/10 min, from about 1.0 to about 10 g/10 min, or from about 1.5 to about 9 g/10 min, where desirable ranges may include ranges from any lower limit to any upper limit. In some embodiments, the PBE may have a MFR of from about 2.5 to about 12 g/10 min, or from about 5.0 to about 10 g/10 min, where desirable ranges may include ranges from any lower limit to any upper limit. In some embodiments, the PBE may have a MFR of from about 0.5 to about 7.0 g/10 min, or from about 1.0 to about 6.0 g/10 min, or from about 2.0 to about 5.0 g/10 min, where desirable ranges may include ranges from any lower limit to any upper limit.

The PBE may have a weight average molecular weight (Mw), as measured by MALLS, of from about 50,000 to about 1,000,000 g/mol, or from about 75,000 to about 500,000 g/mol, from about 100,000 to about 350,000 g/mol, from about 125,000 to about 300,000 g/mol, from about 175,000 to about 275,000 g/mol, where desirable ranges may include ranges from any lower limit to any upper limit. In some embodiments, the PBE may have an Mw of from about 175,000 to about 220,000 g/mol, or from about 180,000 to about 210,000 g/mol, where desirable ranges may include ranges from any lower limit to any upper limit. In some embodiments, the PBE may have an Mw of from about 240,000 to about 300,000 g/mol, or from about 250,000 to about 280,000 g/mol, or from about 260,000 to about 270,000 g/mol, where desirable ranges may include ranges from any lower limit to any upper limit.

The PBE may have a number average molecular weight Mn), as measured by DRI, of from about 5,000 to about 500,000 g/mol, from about 10,000 to about 300,000 g/mol, from about 50,000 to about 250,000 g/mol, from about 75,000 to about 200,000 g/mol, or from about 90,000 to about 150,000 g/mol, where desirable ranges may include ranges from any lower limit to any upper limit. In some embodiments, the PBE may have a Mn of from about 80,000 to about 110,000 g/mol, from about 85,000 to about 105,000 g/mol, or from about 90,000 to about 100,000 g/mol, where desirable ranges may include ranges from any lower limit to any upper limit. In some embodiments, the PBE may have a Mn of from about 110,000 to about 140,000 g/mol, from about 115,000 to about 135,000 g/mol, or from about 120,000 to about 130,000 g/mol, where desirable ranges may include ranges from any lower limit to any upper limit.

The PBE may have a z-average molecular weight (Mz), as measured by MALLS, of from about 50,000 to about 1,000,000 g/mol, from about 75,000 to about 500,000 g/mol, from about 100,000 to about 475,000 g/mol, from about 200,000 to about 400,000 g/mol, or from about 250,000 to about 400,000 g/mol, where desirable ranges may include ranges from any lower limit to any upper limit. In some embodiments, the PBE may have an Mz of from about 270,000 to about 310,000 g/mol, from about 275,000 to about 300,000 g/mol, or from about 280,000 to about 295,000 g/mol, where desirable ranges may include ranges from any lower limit to any upper limit. In some embodiments, the PBE may have an Mz of from about 370,000 to about 420,000 g/mol, from about 380,000 to about 410,000 g/mol, or from about 385,000 to about 400,000 g/mol, where desirable ranges may include ranges from any lower limit to any upper limit.

The molecular weight distribution (MWD, equal to Mw/Mn) of the PBE may be from about 0.5 to about 20, from about 0.75 to about 10, from about 1.0 to about 5, from about 1.5 to about 4, or from about 1.8 to about 3, where desirable ranges may include ranges from any lower limit to any upper limit.

The PBE may have a Shore D hardness of less than about less than about 50, or less than about 45, or less than about 40, or less than about 35. The PBE may have a Shore D hardness of from about 10 to about 50, or from about 15 to about 45, or from about 20 to about 40, or from about 25 to about 35, where desirable ranges may include ranges from any lower limit to any upper limit.

The PBE may have a Mooney viscosity (ML (1+4)@125° C.) of from a low of about 5, 7, or 10 to a high of about 30, 35, or 40, In some embodiments, the PBE has a Mooney viscosity of from about 5 to about 20, or from about 7 to about 18, or from about 10 to about 15, where desirable ranges may include ranges from any lower limit to any upper limit. In some embodiments, the PBE has a Mooney viscosity of from about 10 to about 40, or from about 15 to about 37, or from about 20 to about 35, or from about 25 to about 30, where desirable ranges may include ranges from any lower limit to any upper limit.

In some embodiments, the TPV contains a PBE that is a propylene-ethylene copolymer that has from about 9 wt % to about 15 wt % or from about 10 to about 12 wt %, ethylene-derived units and has at least three, or at least four, or at least five, or at least six, or at least seven, or all eight of the following properties: (i) a Tm of from about 55 to about 70° C., or from about 57 to about 68° C., or from about 60 to about 65° C.; (ii) a Hf of from 5.0 to about 40 J/g, from about 10.0 to about 35 J/g, from about 15 to about 35 J/g, or from about 20 to about 30 J/g, or from about 25 to about 30 J/g; (iii) a MI of from about 1.0 to about 8.0 g/10 min, or from about 2.0 to about 6.0 g/10 min, or from about 2.5 to about 5.0 g/10 min; (iv) a MFR of from about 2.5 to about 12 g/10 min, or form about 5.0 to about 10 g/10 min; (v) a Mw of from about 175,000 to about 220,000 g/mol, or from about 180,000 to about 210,000 g/mol; (vi) a Mn of from about 80,000 to about 110,000 g/mol, from about 85,000 to about 105,000 g/mol, or from about 90,000 to about 100,000 g/mol; (vii) a Mz of from about 270,000 to about 310,000 g/mol, from about 275,000 to about 300,000 g/mol, or from about 280,000 to about 295,000 g/mol; and/or (viii) a Mooney viscosity of from about 5 to about 20; or from about 7 to about 18, or from about 10 to about 15.

In some embodiments, the TPV contains a PBE that is a propylene-ethylene copolymer that has from about 9 wt % to about 15 wt % or from about 10 to about 12 wt %, ethylene-derived units and has at least three, or at least four; or at least five, or at least six, or at least seven, or all eight of the following properties: (i) a Tm of from about 45 to about 65° C., or from about 50 to about 60° C., or from about 52 to about 58° C.; (ii) a Hf of from about 1.0 to about 25 J/g, from about 5.0 to about 20 J/g, from about 10 to 20 J/g, or from about 12 to about 18 J/g; (iii) a MI of from about 0.5 to about 3.0 g/10 min or from about 0.75 to about 2.0 g/10 min; (iv) a MFR of from about 0.5 to about 7.0 g/10 min, or from about 1.0 to about 6.0 g/10 min, or from about 2.0 to about 5.0 g/10 min; (v) a Mw of from about 240,000 to about 300,000 g/mol, or from about 250,000 to about 280,000 g/mol, or from about 260,000 to about 270; 000 g/mol; (vi) a Mn of from about 110,000 to about 140,000 g/mol, from about 115,000 to about 135,000 g/mol, or from about 120,000 to about 130,000 g/mol; (vii) a Mz of from about 370,000 to about 420,000 g/mol, from about 380,000 to about 410; 000 g/mol; or from about 385,000 to about 400; 000 g/mol; and/or a Mooney viscosity of from about 10 to about 40, or from about 15 to about 37, or from about 20 to about 35, or from about 25 to about 30.

Optionally, the PBE may also include one or more dienes. The term "diene" defined as a hydrocarbon compound that has two unsaturation sites; i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). In some embodiments, the diene may be selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD); and combinations thereof. In embodiments where the PBE comprises a diene; the diene may be present at from 0.05 wt % to about 6 wt %, from about 0.1 wt % to about 5.0 wt %, from about 0.25 wt % to about 3.0 wt %, from about 0.5 wt % to about 1.5 wt %, diene-derived units, based upon the total weight of the PBE.

The PBE are preferably prepared using homogeneous conditions, such as a continuous solution polymerization process. Exemplary methods for the preparation of propylene-based polymer may be found in U.S. Pat. Nos. 6,881, 800; 7,803,876; 8,013,069; and 8,026,323 and PCT Publications WO 2011/087729; WO 2011/087730; and WO 2011/087731.

Oil

The TPVs described herein further comprise oil, such as process oils and extender oils. As used herein, process oils are oils that are added directly to the vulcanization process, as compared to extender oils which are oils that are pre-blended with the rubber to extend the rubber prior to vulcanization.

The oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene. Additive oils other than petroleum based oils can also be used, such as oils derived from coal tar and pine tar, as well as synthetic oils, e.g., polyolefin materials.

Oil can be present in the TPV in an amounts of from about 5 to about 300 parts, or from 30 to 250 parts, or from 70 to 200 parts, by weight per 100 parts by weight of total weight of the rubber component and thermoplastic component, where desirable ranges may include ranges from any lower limit to any upper limit.

In some embodiments, oil may be present in the TPV in an amount of from a low of about 10 wt %, or 15 wt %, or 20 wt %, or 25 wt %, or 30 wt %, or 31 wt %, or 32 wt %, or 33 wt %, or 34 wt %, or 35 wt %, to a high of about 40 wt %, or 41 wt %, or 42 wt %, or 43 wt %, or 44 wt %; or 45 wt %, or 50 wt %, or 55 wt %, based on the total weight of the TPV, where desirable ranges may include ranges from any lower limit to any upper limit.

Alternatively, the quantity of oil used can be defined on the basis of the amount of oil introduced to the vulcanization process before the curative is introduced ("pre-cure oil"), oil introduced with the curative, and the amount of oil introduced to the vulcanization process after the curative is introduce ("post-cure oil"). The pre-cure oil may be oil that comes from oil-extended oil and/or process-oil that is directly introduced to the vulcanization process before the curative is added. For example, in some embodiments, the amount of pre-cure oil may range from a low of about 55 wt %, or 56 wt %, or 57 wt %, or 58 wt %, or 59 wt, or 60 wt % to a high of about 65 wt %, or 66 wt %, or 67 wt %, or 68 wt %, or 69 wt %, or 70 wt %, based on the total amount of oil in the TPV, where desirable ranges may include ranges from any lower limit to any upper limit. For example, in some embodiments, the amount of post-cure oil may range from a low of about 25 wt %, 26 wt %, 27 wt %, 28 wt %, 29 wt %, 10 wt %, or 31 wt %, to a high of about 40 wt %, or 41 wt %, or 42 wt %, or 43 wt %, or 44 wt %, or 45 wt %, or 46 wt %, based on the total amount of oil in the TPV, where desirable ranges may include ranges from any lower limit to any upper limit. For example, in some embodiments, the amount of oil introduced with the curative may range from a low of 1 wt %, or 2 wt %, or 3 wt %, or 4 wt %, to a high of about 7 wt or 8 wt %, or 9 wt %, or 10 wt %, based on the total amount of oil in the TPV, where desirable ranges may include ranges from any lower limit to any upper limit.

Curatives

Any curative agent that is capable of curing or crosslinking the rubber component in the thermoplastic vulcanizate may be used. Some non-limiting examples of these curatives include phenolic resins, peroxides, and silicon-containing curatives.

In preferred embodiments, the TPV is cured using a phenolic resin vulcanizing agent. Phenolic resin curatives can also be referred to as resole resins, which are made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred in some embodiments. In some embodiments, a blend of octyl phenol and nonylphenol-formaldehyde resins is employed. The blend may include from 25 wt % to 40 wt octyl phenol and from 75 wt % to 60 wt % nonylphenol, more preferably, the blend includes from 30 wt % to 35 wt % octyl phenol and from 70 wt % to 65 wt % nonylphenol. In some embodiments, the blend includes about 33 wt % octylphenol-formaldehyde and about 67 wt % nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which may be referred to as alkylphenol-formaldehyde resins (also available in a 30/70 weight percent paraffinic oil solution under the trade name HRJ-14247A). SP-1045 is believed to be an octylphenol-formaldehyde resin that contains methylol groups. The SP-1044 and SP-1045 resins are believed to be essentially free of halogen substituents or residual halogen compounds. By "essentially free of halogen substituents," it is meant that the synthesis of the resin provides for a non-halogenated resin that may only contain trace amounts of halogen containing compounds.

Preferred phenolic resin may have a structure according to the following general formula:

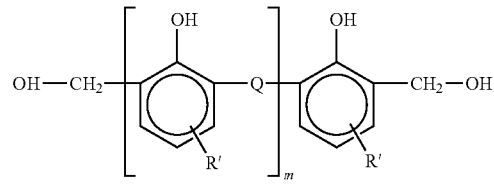

where Q is a divalent radical selected from the group consisting of —CH2- and CH 2-O—CH 2-; m is zero or a positive integer from 1 to 20 and R' is an alkyl group. Preferably, Q is the divalent radical —CH 2-O—CH 2-, m is zero or a positive integer from 1 to 10, and R' is an alkyl group having less than 20 carbon atoms. Still more preferably, in is zero or a positive integer from 1 to 5 and R' is an alkyl group having between 4 and 12 carbon atoms.

The phenolic resin can be introduced into the extrusion reactor in a form of phenolic resin-in-oil ("RIO"), which means the phenolic resin is believed being dispersed and/or dissolved in a mineral oil. The mineral oil can include aromatic mineral oils, naphthenic mineral oils, and paraffinic mineral oils. The method of dispersing and/or dissolving an phenol resin in a mineral oil may be any method known in the art, for example, a method in which the phenolic resin and the mineral oil are fed at once into a glass container equipped with a stirrer and heated under stirring on a water bath of 60 to 100° C. for 1 to 10 hours, as described in U.S. Patent Application Publication No. 2013/0046049 A1.

Other examples of suitable phenolic resins include those described in U.S. Pat. No. 8,207,279 and U.S. Patent Application No. 2013/0046049 A1.

In one or more embodiments, the phenolic resin may be employed in an amount from about 2 to about 20, or from about 3 to about 15, or from about 4 to about 10 phr.

Cure Accelerator

The curative may be used in conjunction with a cure accelerator. The cure accelerator may be used to increase the degree of vulcanization of the TPV. Useful cure accelerators include metal halides, such as stannous chloride, stannous chloride anhydride, stannous chloride dehydrate, and ferric chloride. In preferred embodiments, the cure accelerator comprises anhydrous stannous chloride. The cure accelerator is introduced into the vulcanization process as part of a masterbatch as described herein.

The stannous chloride can be used in its hydrous (SnC22H2O) or anhydrous (SnCl2) form. The stannous chloride can be used in a powdered, granulated, or flake form.

In some embodiments the cure accelerator is added in an amount of less than 1 wt % based on the total weight of the TPV. In some embodiments, stannous chloride may be used in an amount of from about 0.5 to about 2.0 phr, or from about 1.0 to about 1.5 phr, or from about 1.2 to about 1.3 phr.

Metal Oxide

In some embodiments, metal oxides may be added to the vulcanization process. The metal oxide can act as a scorch retarder in the vulcanization process, Useful metal oxides include zinc oxides having a mean particle diameter of about 0.05 to about 0.15 µm. Useful zinc oxide can be obtained commercially under the tradename Kadox™ 911 (Horsehead Corp.).

In some embodiments, from about 0.1 to about 6.0 phr, or from about 1.0 to about 5.0 phr, or from about 2.0 to about 4.0 phr of zinc oxide may be employed.

Additives

The TPV may further comprise one or more additives. These additives may be present in addition to, or in place of the additives which may be present in the rubber and thermoplastic resin compositions used to make the TPV. Suitable additives include, but are not limited to, plasticizers, fillers, and processing aids.

The TPV composition may also include reinforcing and non-reinforcing fillers, antioxidants, stabilizers, antiblocking agents, anti-static agents, waxes, foaming agents, pigments, flame retardants and other processing aids known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

In one or more embodiments, the TPV includes at least about 5 wt %, 6 wt %, 7 wt %, 8 wt %, 9 wt %, or 10 wt % or of one or more fillers, such as calcium carbonate, clays, silica, talc, titanium dioxide, carbon black, and blends thereof, based on the weight of the TPV. In preferred embodiments, the TPV includes clay and/or carbon black in an amount ranging from a low of about 5 wt %, 6 wt %, 7 wt %, 8 wt %, 9 wt %, or 10 wt % to a high of about 15 wt %, 16 wt %, 17 wt %, 18 wt %, 19 wt %, or 20 wt %, based on the total weight of the TPV.

In one or more embodiments, the TPV comprises antioxidants in an amount less than or equal to 5 wt %, or 4 wt %, or 3 wt %, or 2 wt %, or 1 wt %, or 0.5 wt %, based on the total weight of the TPV, where desirable ranges may include ranges from any lower limit to any upper limit.

Methods for Making Thermoplastic Vulcanizate Compositions

Any process for making TPVs may be employed. In one or more embodiments, the individual materials and components, such as the one or more rubber components, thermoplastic resin components, additive oils, curatives, other additives, etc., may be blended by melt-mixing in any order in a mixer heated to above the melting temperature of the thermoplastic resin component. Illustrative mixing equipment include: extruders with kneaders or mixing elements with one or more mixing tips or flights, extruders with one or more screws, and extruders of co or counter rotating type. Suitable mixing equipment also includes Brabender™ mixers, Banbury™ mixers, Buss mixers and kneaders, and Farrell Continuous mixers, for example. One or more of those mixing equipment, including extruders, can be used in series.

The one or more components, thermoplastic resin components, and curing agents can be added to a heated mixer as individual feed streams, as a tumbled blend, or as a masterbatch. The one or more thermoplastic resin components can be added before cure or divided in any proportions between, before, or after the addition of the curative. The additive oil, e.g., process oil, can be added during mastication before the addition of the curative, after the addition of the curative, or divided in any proportions between before and after the addition of the curative.

Preferably, the one or more curing agents are incorporated into the melt within a target range of melt temperature over a specified period of time (<120 seconds). The one or more curing agents can be added using any suitable technique, such as by injection as a solution in a compatible process oil, as a neat solid, as a neat melt, or as a masterbatch, for example.

One or more fillers or other additives can be introduced to the melt either before, during or after the addition of the curative. The additives, fillers or other compounds, which may interfere with the curing agents, should be added after curing reaches the desired level. Preferably, those additives are added to the melt as a slurry or paste in a compatible rubber process oil. Powder blends or masterbatches of these components can be prepared in a wax or polymer carrier to facilitate metering and mixing. A side feeder can also be used to add the one or more mineral fillers and other additives.

The required mixing for discrete rubber phase morphology and properties can be developed through choice of screw design and screw speed. It is convenient to follow the progression of vulcanization (crosslinking) by monitoring melt temperature or mixing energy or mixing torque requirements during mixing. The mixing torque or mixing energy curve generally goes through a maximum after which the mixing can be continued to achieve the desirable cure level (state) and improve the fabricability for the blend. Following the cure and sufficient mixing of the melt, the melt blend can be processed to form an elastomeric structure using any one or more of the following techniques: milling, chopping, extrusion, pelletizing, injection molding, or any other desirable technique. Additional details for making a TPV may include those described in U.S. Pat. Nos. 4,594,390; 4,130,535; 4,311,628; and 6,042,260, as well as U.S. Patent Application Publications 2006/0293457 and WO 2004/009327.

The method for making the TPVs described herein may comprise: (a) introducing a rubber to an extrusion reactor; (b) introducing at least one thermoplastic resin to the extrusion reactor, such as introducing at least 10 wt % of the at least one thermoplastic resin to the extrusion reactor; (c) optionally, introducing PBE to the extrusion reactor, such as introducing from 1 wt % to 9 wt % of the PBE; (d) introducing at least 5 wt % of one or more fillers, based on the total weight of the thermoplastic vulcanizate, to the extrusion reactor; (e) introducing a first amount of process oil to the extrusion reactor at a first oil injection location; (f) introducing curative to the extrusion reactor a location that is downstream of the first oil injection location and that is downstream of the location where the PBE is introduced to the extrusion reactor; (g) introducing a second amount of process oil to the extrusion reactor at a second oil injection location, where the second oil injection location is downstream of the location where the curative is introduced to the extrusion reactor; and (h) dynamically vulcanizing at least a portion of the rubber with the curative in the presence of the thermoplastic resin and the PBE to form the thermoplastic vulcanizate. In certain embodiments, the (h) dynamic vulcanization may be carried out so as to ensure that the rubber is only partially cross-linked, e.g.; to allow for additional cross-linking upon later heating of the formed TPV article.

The present method can provide a TPV at an extrusion rate of at least about 60 kg/hour, or at least about 65 kg/hour, or at least 70 kg/hour, or at least about 75 kg/hour, or at least about 80 kg/hour, or at least about 85 kg/hour, or at least 90 kg/hour, or at least about 95 kg/hour. Increased extrusion rates are advantageous for commercial production as more product can be made for a given amount of time.

In preferred embodiments, the extrusion reactor is a multi-screw extruder, such as a twin-screw extruder. Those skilled in the art will recognize that the extruder can be configured using different barrel lengths, and different arrangements of solid barrels and combination barrels, depending on processing requirements. Also, ports may be included wherever they are deemed useful. Those skilled in the art will also recognize that the gearing can be changed to alter the rotation of one or more of the screws with appropriate screw designs. For example, a screw design with several mixing sections including a combination of forward convey, neutral, left handed kneading blocks and left handed convey elements may be used. The mixing sections of the screw may be chosen to ensure adequate mixing of the process oil and cure agents, while providing sufficient residence time and shear for completing the cure reaction, without slip or surging in the extruder.

In some embodiments, the extrusion reactor is chosen such that there are at least 5, or at least 7, or at least 10, or at least 15 barrel sections. In some embodiments of the method, the rubber, thermoplastic resin, and optional PBE are introduced to the extrusion reactor in the feed throat, or the first barrel section of the reactor, or in one of the first five barrel sections of the extrusion reactor. The curative is introduced to the extrusion reactor in a section that is downstream of where the PBE, if any, is introduced to the extrusion reactor.

The free process oil may be introduced to the extrusion reactor in at least two different locations. A first amount of the process oil may be introduced to the extrusion reactor at a first oil injection location that is upstream of the location where the curative is introduced to the extrusion reactor. A second amount of the process oil may be introduced to the extrusion reactor at a second oil injection location that is downstream of the location where the curative is introduce to the extrusion reactor. In some embodiments, from about 55 wt %, or 56 wt %, or 57 wt %, or 58 wt %, or 59 wt %, or 60 wt % to about 65 wt %, or 66 wt %, or 67 wt %, or 68 wt %, or 69 wt %, or 70 wt %, of process oil, based on the total amount of oil in the TPV, may be introduced to the extrusion reactor at the first oil injection location. In some embodiments, from about 25 wt %, 26 wt %, 27 wt %, 28 wt %, 29 wt %, 30 wt %, or 31 wt %, to about 40 wt %, or 41 wt %, or 42 wt %, or 43 wt %, or 44 wt %, or 45 wt %, or 46 wt %, of process oil, based on the total amount of oil in the TPV, may be introduced to the extrusion reactor at the second oil injection location.

In some embodiments, the extent of curing or vulcanization of the rubber component of the TPV may be controlled according to one or more of the composition of the TPV and the operations of the vulcanization process. For example, the amount of the rubber component of the composition of the TPV according to aspects of the invention may be increased relative to conventional TPVs and/or the amount of curing agent or accelerator of the composition of the TPV according to aspects of the invention may be decreased relative to conventional TPVs such that the rubber component of the TPV is only partially vulcanized during the vulcanization process. Additionally or alternatively, conditions of the operations of the vulcanization process, static or dynamic, may be controlled, for example, to have a decreased temperature, duration, and/or severity relative to general conventional conditions of static or dynamic vulcanization processes such that the rubber component of the TPV is only partially vulcanized during the vulcanization process. For example, the duration or temperature of melt-extruding of the TPV ingredients in the presence of a curative and/or cure accelerator may be decreased or the extrusion rate may be increased relative to conventional processes. The conditions of the operations of the vulcanization process will vary with such factors as the rubber components, thermoplastic components, oils, curatives, accelerators, metal oxides, additives, etc., employed. Additional details for making a TPV having a partially vulcanized rubber component may include those described in U.S. Pat. No. 3,862,106.

Product Characteristics

In one or more embodiments, the TPV is cured to an extent such that the rubber is initially partially vulcanized and then aged to complete vulcanization of the product. In some embodiments, the TPV is cured by dynamic or static vulcanization such that more than 5 wt %, or more than 10 wt %, or more than 15 wt % of the rubber is extractable in boiling xylene. Alternatively, in one or more embodiments, the rubber has a degree of cure such that the crosslink density is preferably less than 10×10-5, or less than 7×10-5, or less than 4×10-5 moles per milliliter of rubber. See also "Crosslink Densities and Phase Morphologies in Dynamically Vulcanized TPEs," by Ellul et al, RUBBER CHEMISTRY AND TECHNOLOGY, Volume 68, pp. 5'73-584 (1995).

Despite the fact that the rubber may be partially cured, the TPV can be processed and reprocessed by conventional plastic processing techniques such as extrusion, injection molding, blow molding, and compression molding before aging to fully cure the product. And, even after being fully cured, the TPV can be similarly processed and reprocessed. The rubber within these TPVs can be in the form of finely-divided and well-dispersed particles of vulcanized or cured rubber within a continuous thermoplastic phase or matrix. Before and after aging, the rubber particles can have an average diameter that is less than 50 µm, or less than 30 µm, or less than 10 µm, or less than 5 µm, and or less than 1 µm. In some embodiments, the rubber particles have an average diameter greater than 2 millimicrons, or greater than 5 millimicrons, or greater than 10 millimicrons. In certain embodiments, at least 50%, optionally at least 60%, and optionally at least 75% of the rubber particles have an average diameter of less than 5 µm, or less than 2 µm, or less than 1 µm. Aging of the TPV may increase the average diameter of the particles of the vulcanized rubber in the continuous thermoplastic phase.

As described herein, the TPV comprises: (i) rubber; (ii) thermoplastic resin; (iii) PBE; (iv) oil; and (v) filler(s). Preferably, the TPV comprises at least 10 wt % of thermoplastic resin, from 1 to 9 wt % of PBE, and at least 5 wt % of one or more fillers. The ingredients of the TPV are mixed in the extrusion reactor such that the resulting TPV comprises a rubber phase that is dispersed and at least partially cross-linked within a continuous thermoplastic component that comprises thermoplastic resin and PBE. In some embodiments, the thermoplastic resin comprises a fractional polypropylene and a second polypropylene having a melt flow rate higher than the melt flow rate of the fractional polypropylene. In some embodiments, the thermoplastic resin comprises a fractional polypropylene having a melt flow rate of less than 2 g/10 min, a second polypropylene having a melt flow rate of from about 25 to about 45 g/10 min, and a third polypropylene having a melt flow rate of from about 5 to about 30 g/10 min, where the second and third polypropylenes are different.

In some embodiments, the TPV may have a Shore A hardness of greater than 60, or greater than 65, or greater than 70, or greater than 75, and less than 90, or less than 85, or less than 80, or less than. 75. Such TPVs may beneficially exhibit an ultimate elongation of greater than 400%, or greater than 410%, or greater than 415%, or greater than 420%, or greater than 425%, or greater than 430%, e.g., 600% or greater.

Heat Shrinking

The TPV compositions described herein may be useful for making articles by extrusion, injection molding, blow molding, calendaring and compression molding techniques followed by a heat treatment aging process to shrink the article. Particularly, the TPV compositions herein may be useful for making a variety of articles such as heat shrink tubes disposable about another article, heat shrink tubes for securing two or more separate pieces together, and/or heat shrink articles that cure to bond to other articles. The TPV compositions may be also user for making articles such as molded corners, molded end caps, glass run channels, trunk seals, tailgate seals, cowl seals, gap fillers, glass encapsulation, cut line seals, door seals, hood-to-radiator seals, windshield seals, sunroof seals, roof line seals, rear window seals, rocker panels, sashes, and belt-line seals. In one or more embodiments, the TPVs described can be at least partially adhered to a glass substrate, such as for glass encapsulation. Illustrative uses for glass encapsulation include windshield seals, sunroof seals, rear window seals, side window seals, and quarterlight seals, for example. Preferably, the thermoplastic elastomer composition is extruded using techniques known in the art to form an extruded elastomeric profile or gasket. This extruded profile or gasket is then adhered to the glass substrate and/or aged via heat treatment to shrink the extruded profile or gasket to adhere and/or fit to the glass substrate.

As described herein, the TPVs and/or TPV articles according to the current invention exhibit exceptional shrinkage at least in the machine direction (MD) when exposed to heat. This shrinkage may be particularly useful e.g., to secure one or more parts and/or bond to one or more parts during a heat treatment/aging process. For example, the rubber component of the TPV composition of a molded or extruded article may have improved bonding or cross-linking with a crosslinkable polymer of another part, e.g., an EPDM weather stripping part, to form a single part during the heat treatment process. Alternatively or additionally, a molded or extruded article having a TPV composition according to aspects of the invention may be at least partially disposed about two or more parts to be secured and heat treated or aged to shrink and/or bond the article to one or more of the parts and to secure the two or more parts together.

The methods and processes for bonding or joining one or more articles of the present invention to one or more parts may include, for example, providing a TPV having a composition as described herein and heat treating or aging the article such that the article contracts in at least one of the machine direction or the transverse direction. The machine direction may be a result of the extruding or molding the TPV composition to shape or form the article. The TPV may be provided as a molded or extruded article having a composition including a partially vulcanized rubber dispersed in a continuous thermoplastic phase. The partially vulcanized rubber may include a portion that is extractable in boiling xylene, for example, more than 5 wt %, more than 10 wt %, or more than 15 wt %. The amount of contraction of the article may be dependent upon the extent of vulcanization of the rubber of the TPV before the article is heat treated or aged. For example, the less then rubber component is vulcanized, the greater the extent of contraction upon heat treating or aging.

Without wishing to be bound by theory, it is believed that TPVs of some embodiments, in which the thermoplastic component comprises thermoplastic resin and a PBE, may shrink when exposed to heat due at least in part to the difference of Tm between the PBE and the thermoplastic resin. For instance, where the thermoplastic resin has Tm greater than 110° C., preferably greater than 120° C. or even 130° C., and the PBE has Tm less than 110° C., preferably less than 100° C. or less than 90° C., such differences in Tm may contribute to increased contraction upon heat treatment in that the thermoplastic component of the TPV melts at a lower temperature and over a wider temperature range.

Also or instead, heat shrinking may be brought about at least in part by the presence of only partially vulcanized rubber component; heat treatment according to some such embodiments may further vulcanize the rubber portion of the TPV and, in so doing, shrink the TPV and/or TPV article, and/or it may bond the article seamlessly or nearly seamlessly to one or more other parts without an adhesive. The further vulcanization of the rubber portion may result in the rubber portion being fully vulcanized. Such partial vulcanization of the rubber component allows for the TPV and/or TPV article to provide additional processability over conventional TPVs at least in that the TPV and/or TPV article may be heat treated to further vulcanize the rubber component, resulting in shrinking the TPV and/or TPV article. The partially vulcanized state of the TPV and/or TPV article may be a result of the rubber component not fully vulcanizing upon initial processing, which may be effected by composition or processing. For example, a partial vulcanization of the rubber component may be effected by providing a composition having a relatively higher ratio of rubber component to curing agent, or by processing the composition to have a relatively faster residence time in dynamic vulcanization or a relatively lower dynamic vulcanization temperature, etc., relative to conventional TPVs. The skilled artisan with the benefit of this disclosure will readily appreciate how to achieve a reduced (i.e., partial) vulcanization of the rubber component during TPV formation.

Accordingly, a TPV or TPV article of some embodiments may be heat treated or aged to effect contraction of the article in at least one of the MD and the transverse direction, or cross direction (CD). Such contraction may be useful, e.g., for shrink-fitting the TPV article so as to secure one or more other objects. For example, the TPV article may be heated to shrink the TPV article about at least a portion of one object to strengthen said portion of the object. As another example, the TPV article may be heated to shrink about at least a portion of each of two objects to secure or bond the two objects together. In particular embodiments, such object or objects may include electrical components such as wiring, insulation, and/or cabling. The heat treatment or aging may be performed at a temperature from about 100° C. to about 250° C., or about 110° C. to about 200° C., or about 120° C. to about 175° C., or about 130° C. to about 150° C., where desirable ranges may include ranges from any lower limit to any upper limit.

The heat treatment or aging may be for a time, for example, of less than 30 seconds, about 30 seconds to about 210 seconds, or about 60 seconds to about 180 seconds, or about 90 seconds to about 150 seconds, or about 120 seconds, where desirable ranges may include ranges from any lower limit to any upper limit.

Heat treatment or aging may be utilized to shrink the TPV or TPV article in the MD by, for example, 10%, 15%, 20% or greater. The TPV or TPV article may shrink in the MD by, for example, 24%. TPV or TPV article shrinkage may be as much as 30%, 40%, 50%, 60%, or greater in some instances. The heat treatment or aging may result in a shrinkage in the CD of a TPV or a TPV article different from or less than the shrinkage in the MD of the same TPV or TPV article. For example, the TPV or TPV article may have a shrinkage in the MD according to any of the foregoing embodiments, while the shrinkage in the CD of the same TPV or TPV article is less than 10%, 8%, 5%, or less (e.g., within the range from 0% to 10%, such as 0.5% to 8%, or 0.5% to 5%). As used herein, the percentage used to describe a shrinking of TPV or TPV article indicates a decrease in a dimension with respect to an original, pre-heat length. For example, a 20% shrinkage of TPV article having a pre-heat dimension of 10 cm would result in post-heat dimension of the TPV article of 8 cm. Similarly, a 20% shrinkage of TPV article having a pre-heat dimension of 20 cm would result in post-heat dimension of the TPV article of 16 cm.

EXAMPLES

In order to provide a better understanding of the foregoing discussion, the following non-limiting examples are offered. Although the examples may be directed to specific embodiments, they are not to be viewed as limiting the invention in any specific respect.

Example 1

A TPV composition was produced according to aspects of the invention to include 175 phr of oil extended rubber component (100 phr rubber, 75 phr extender oil). The TPV composition of Example 1 also included 42 phr of PBE, 72 phr of a thermoplastic resin, and 120.61 phr total of: Icecap™ K Clay, Sunpar 150M Oil, phenolic resin in Sunpar 115 Oil, carbon black master batch in PP (40 wt % carbon black and 60 wt % PP), stannous chloride masterbatch (45 wt % SnCl2 in 55 wt % of PP), zinc oxide, and nucleator (Hyperform HPN-68L polyolefin nucleator).

The rubber component of the TPV of Example 1 was Vistalon™ 3666 EPDM rubber which is an ethylene-propylene-diene rubber that has 64.0 wt % ethylene content (ASTM D3900) and 4.5 wt % ENB diene content (ASTM D6047). V3666 is oil extended with 75 phr of oil and has an oil-extended Mooney Viscosity of 52 MU (ML 1+4, 125° C.; ASTM D1646). V3666 is commercially available from ExxonMobil Chemical Company, Houston, Tex.

The thermoplastic resin of the thermoplastic component of the TPV of Example 1 was Adsvl 5C30F, a random terpolymer obtained by ZieglerNatta catalysis containing 3.3 wt % C2, 90.7 wt % C3 and 6.0 wt % C4, melt flow index (230° C., 2.16 kg load)=5.5 dg/min.

The PBE of the thermoplastic component of the TPV of Example 1 was Vistamaxx™ 3000 (VM3000) propylene-based elastomer which is a random propylene-ethylene copolymer with an ethylene content of 11 wt %. VM3000 has a density of 0.873 g/cc (ASTM D1505), a melt index of 3.6 g/10 min (ASTM D1238; 190° C. and 2.16 kg weight), a MFR of 8 g/10 min (ASTM D1238; 230° C. and 2.16 kg weight), a Shore D hardness of 33 (ASTM D2240), and a Vicat softening temperature of 65.6° C. VM3000 is commercially available from ExxonMobil Chemical Company, Houston, Tex.

Comparative Example 1

A TPV composition was produced according to Comparative Example 1 invention to include 175 phr of oil extended rubber component (100 phr rubber, 75 phr extender oil). The TPV composition of Example 1 also included 64.3 phr of thermoplastic resin, and 144.8 phr total of: Icecap™ K Clay, Sunpar 150M Oil, phenolic resin in Sunpar 115 Oil, carbon black master batch in PP (40 wt % carbon black and 60 wt % PP), stannous chloride masterbatch (45 wt % SnCl2 in 55 wt % of PP), and zinc oxide.

The rubber component of Comparative Example 1 was Vistalon™ 3666 EPDM rubber and the thermoplastic resin was Borealis BC245MO (3.5 MFR low rubber impact copolymer, sg=0.905 g/cm3).

Experimental Results

FIG. 1 is a table showing length, width, and weight change of four plaques of Example 1 and one plaque of Comparative Example 1 for heat aging for 2 minutes at designated temperatures, and FIG. 2 is a photograph showing the ISO 188 sample plaque for Example 1 before (image on the right) and after (image on the left) heat aging. Weight change of the sample plaques was determined based on ISO 188: the oven was conditioned at the respective experimental temperature for 4 hours; each of the samples were cut to a certain size in accordance with ISO 188 by die cutter, and then weighed; the samples were placed in the oven for 2 minutes and then removed; and the samples were weighed again after aging.

Size change was determined according to the following: the oven was conditioned at the respective experimental temperatures for 1 hour; the size of each of the plaques was measured by the distance between cross marks shown in FIG. 2; the samples were put into the oven for 2 minutes and then removed; and the samples were measured again.

As shown in FIG. 1, Example 1 had an original length of 124 trim, an original width of 75.5 mm. After aging for 2 minutes at 150° C., Example 1 decreased in length to a length of 113 mm and increased in width to a width of 76.8 mm. Example 1 decreased in weight by 0.03% after aging for 2 minutes at 150° C. Comparative Example 1 had an original length of 123.5 mm and an original width of 75 ram. After aging for 2 minutes at 150° C., Comparative Example 1 decreased in length to a length of 123 mm and increased in width to a width of 75.5 mm. Comparative Example 1 decreased in weight by 0.02% after aging for 2 minutes at 150° C.

Figure 3:
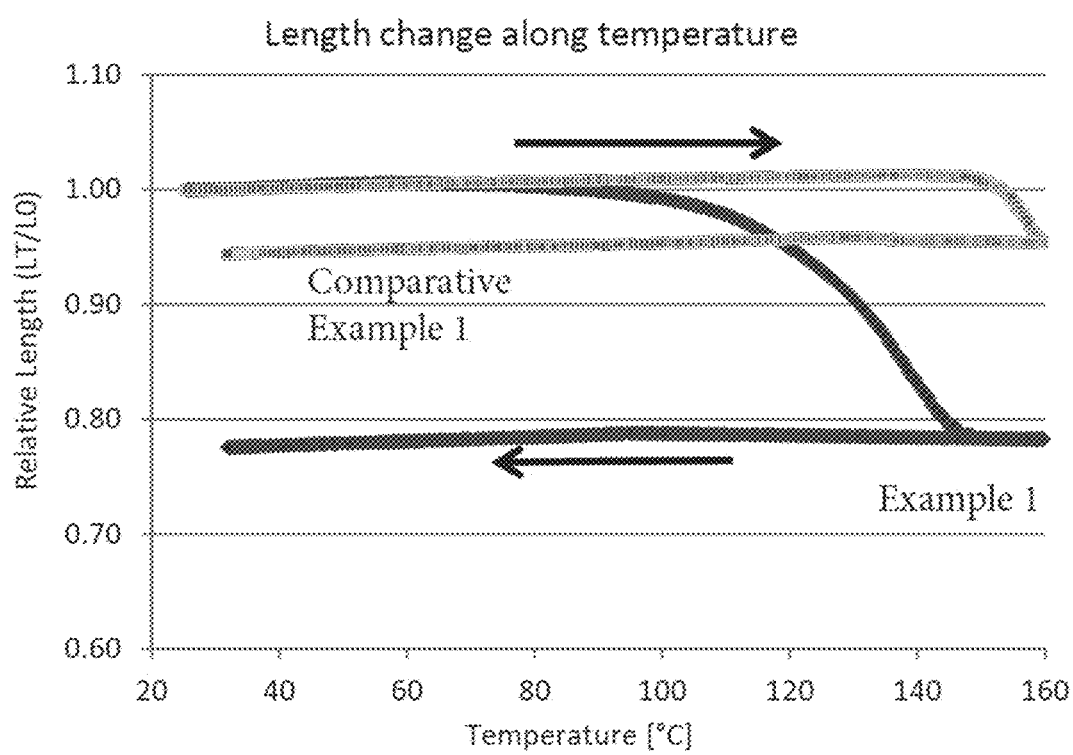
FIG. 3 is a graph showing sample length change according to temperature determined by Dynamic Mechanical Thermal Analysis (DMTA).

It was found that the size the TPV of Example 1 changed more than the TPV of Comparative Example 1 after aging for 2 minutes at 150° C. However, the weight of the TPVs of Example 1 and Comparative Example 1 show almost no change, which means the deformation is not caused by material volatilization. It is believed that the deformation may be caused by stress relaxation, material melting, crystallization change, and/or molecule movement. FIG. 3 is a graph showing sample length change according to temperature determined by Dynamic Mechanical Thermal Analysis (DMTA). DMTA may be used to understand the shape change of the samples according to temperature. In a separate experiment, shrinkage was observed in plaques of Example 1 and Comparative Example 1 during heating as shown in FIG. 3. For Comparative Example 1, it could be understood that the PP phase started to melt at about 150° C. to cause about 5% contraction along the MD. At temperatures less than about 150° C., the TPV of Comparative Example 1 is quite stable. However, Example 1 starts to shrink at about 60° C., which may be related to melting of the PBE of the TPV of Example 1. The melting of the PBE of Example 1 will cause slight expansion shown at a temperature of about 60° C. Surprisingly, the deformation of the plaque of the TPV of Example 1 stopped about 150° C. Above this temperature, the plaque of the TPV of Example 1 is stable again and reached about 24% contraction in the MD.

Further, separate heat treatment of a plaque of Example 1 was observed under optical microscope to demonstrate the deformation process. The observation revealed that a sample of Example 1 TPV expands at lower temperature in ND (neutral direction) at around 90° C., then a significant shrinkage in MD (machine direction) ended at around 155° C.

Figure 4A:
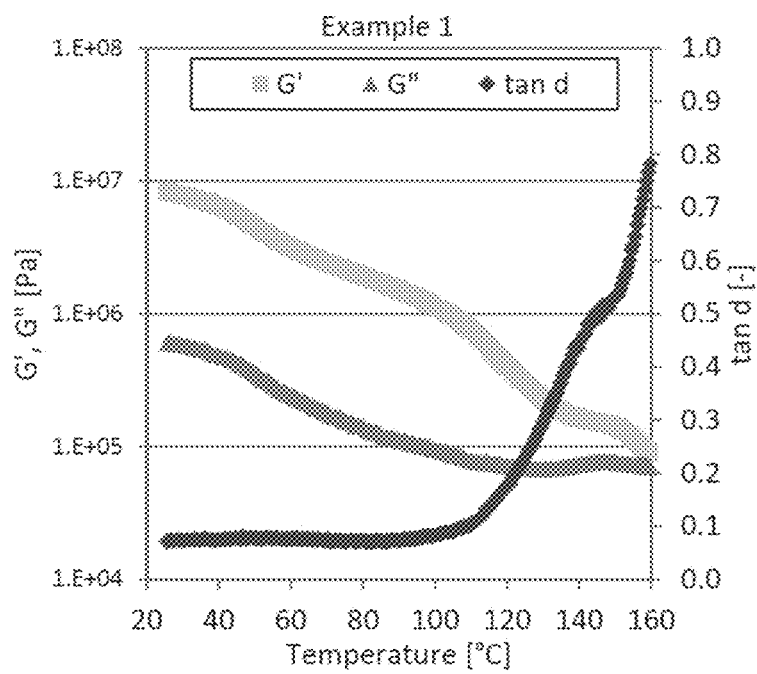
FIG. 4A shows modulus curve data as determined by DMTA for the TPV of Example 1.
Figure 4B:
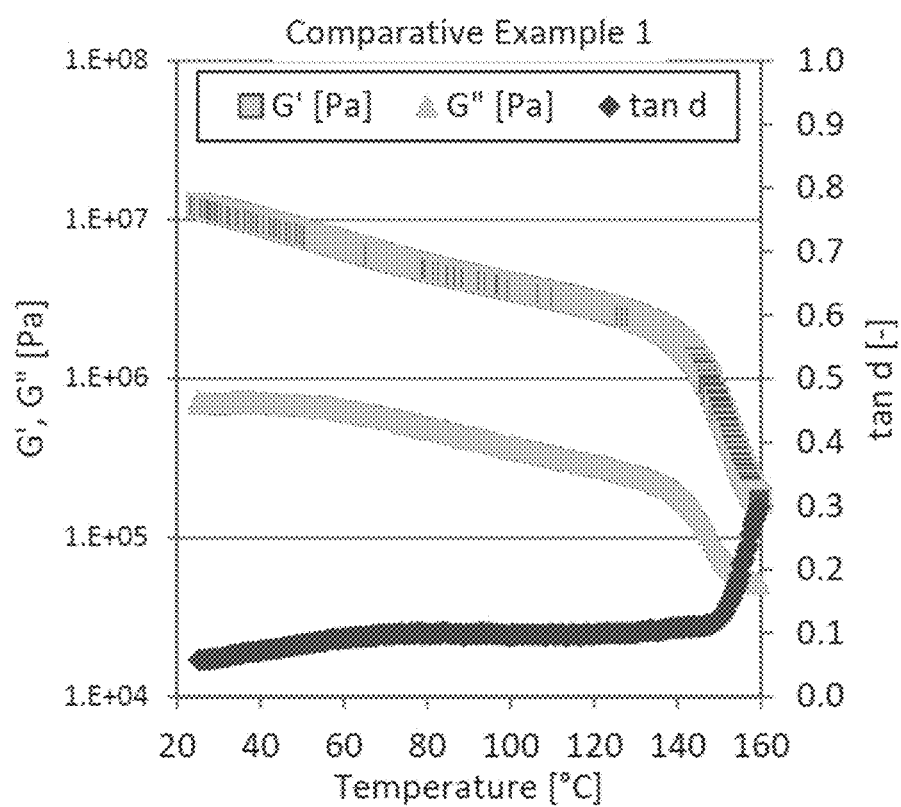
FIG. 4B shows modulus curve data as determined by DMTA for the TPV of Comparative Example 1.

FIG. 4A shows modulus curve data as determined by DMTA for the TPV of Example 1. FIG. 4B shows modulus curve data as determined by DMTA for the TPV of Comparative Example 1. G', G", and tan delta of Example 1 and Comparative Example 1 are shown in FIGS. 4A and 4B. It is clear that Comparative Example 1 has higher elasticity than Example 1, and Comparative Example 1 is more stable over the temperature range. Example 1 starts to lose elasticity from 80° C., which could be caused by the melt of the PBE followed by melt of the thermoplastic resin, and/or h the further vulcanization of only partially vulcanized rubber particles in the TPV.

Figure 5A:
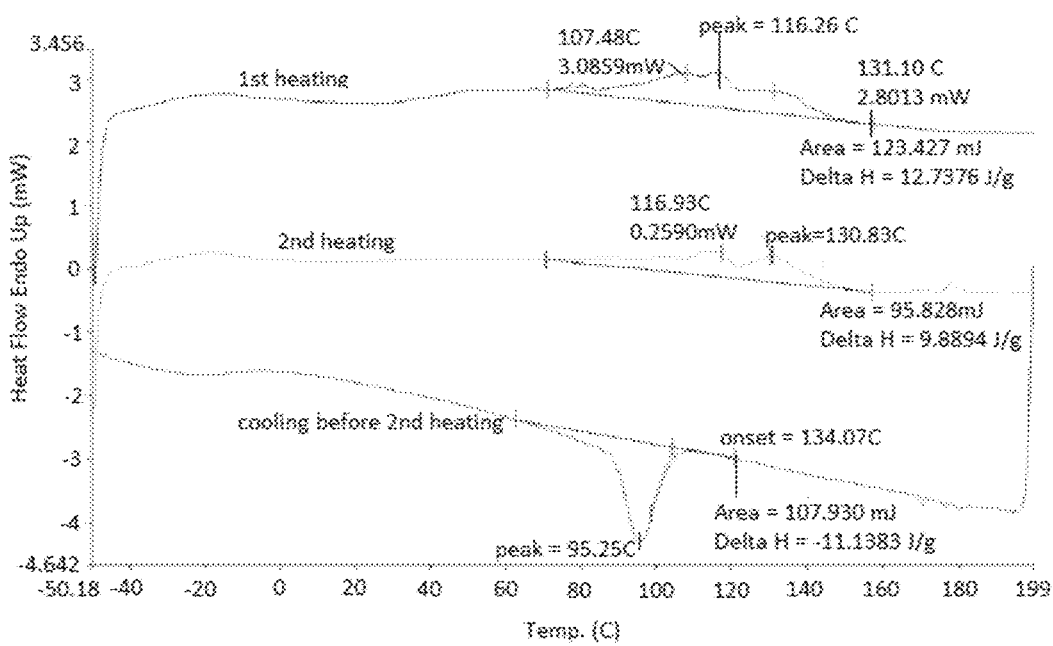
FIG. 5A shows Differential Scanning calorimetry (DSC) curves for the TPV of Example 1.
Figure 5B:
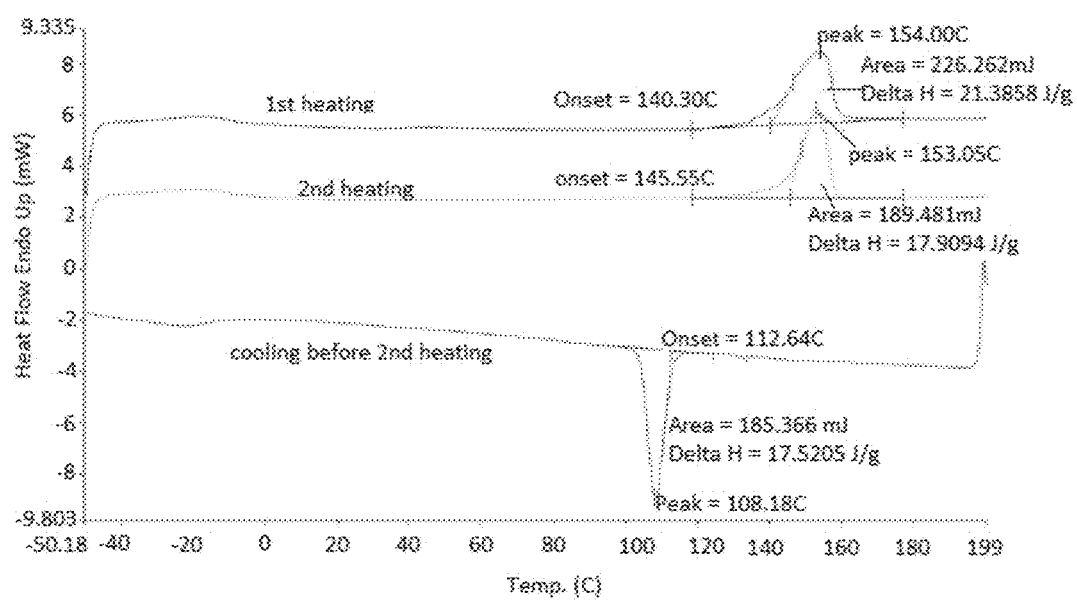
FIG. 5B shows DSC curves for the TPV of Comparative Example 1.

FIG. 5A shows DSC curves for a TPV formulated in accordance with Example 1. FIG. 5B shows DSC curves for the TPV of Comparative Example 1. FIG. 5B shows that Comparative Example 1 has melting peak around 155° C., which is similar to conventional TPVs. On the other hand, Example 1 has multiple melting peaks starting from about 60° C., correlating to the transitions observed in the DMTA data as shown FIG. 4A. The peaks of the DSC data of FIG. 5A may indicate melting of PBE followed, by melting of thermoplastic resin. The PBE may lower the Tm of the thermoplastic matrix of the TPV of Example 1, resulting in size instability at a much lower temperature relative to the Comparative Example 1. The oriented rubber phase is easier to gain mobility in PBE-thermoplastic resin matrix compared to in the thermoplastic resin matrix alone, and 60° C. is enough to allow the rubber phase shrink to release residual stress of the rubber phase from the manufacturing process. When temperature reached 150° C., the melting of PBE-thermoplastic matrix completed according to DSC. At that temperature, the oriented rubber phase was free to agglomerate since the rubber phase has limited interfacial interaction with PBE-thermoplastic resin matrix at such temperatures.

Figure 6:
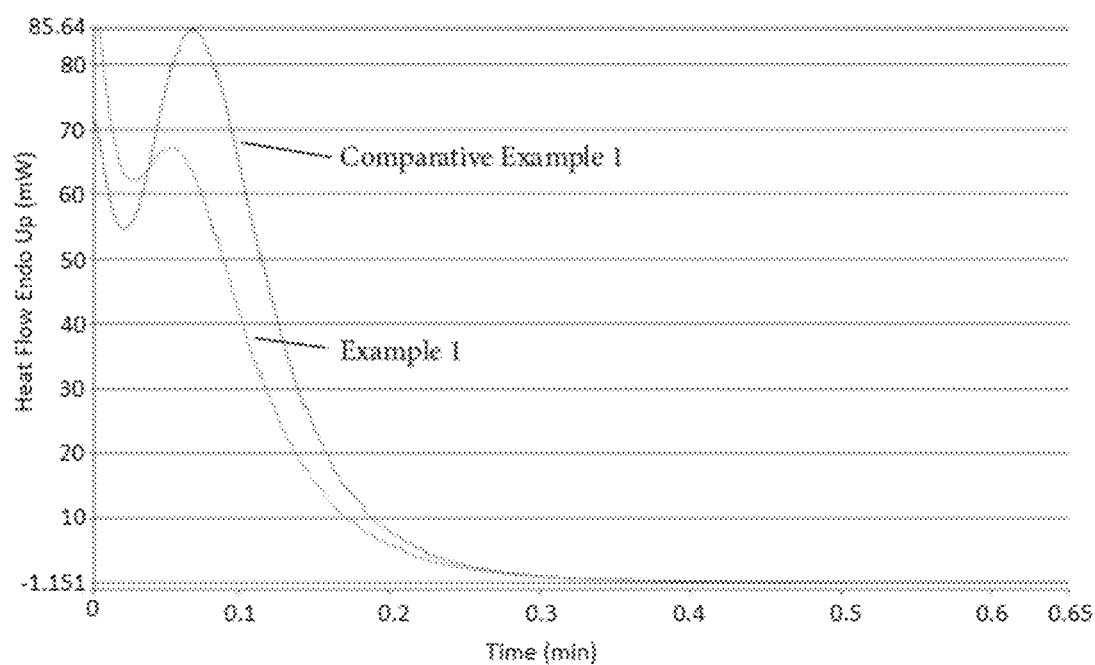
FIG. 6 shows isothermal data for each of Example 1 and Comparative Example 1.

FIG. 6 shows isothermal data for each of Example 1 and Comparative Example 1. The isothermal test was completed at 150° C. but large differences for the TPVs of Example 1 and Comparative Example 1 were not found. The isothermal test was performed by holding the sample at 25° C. for 1 min, heating the sample from 25° C. to 150° C. at 300° C./min, and holding the sample at 150° C. for 20 min.

Figure 7:
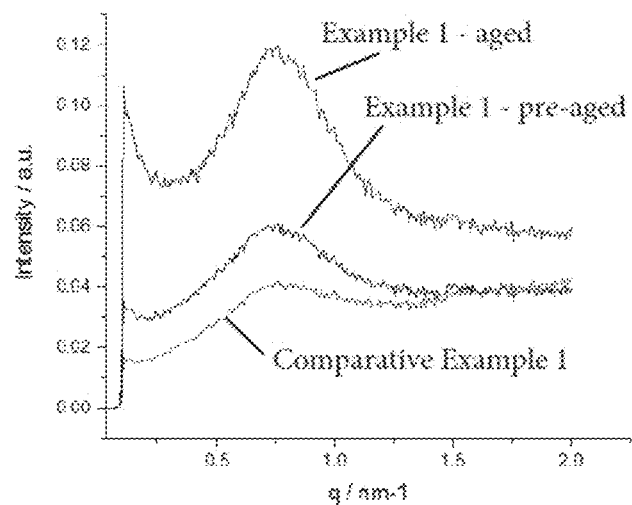
FIG. 7 shows comparison of small angle X-ray scattering (SAXS) data for the TPVs of Example 1, before and after aging, and Comparative Example 1.
Figure 8A:
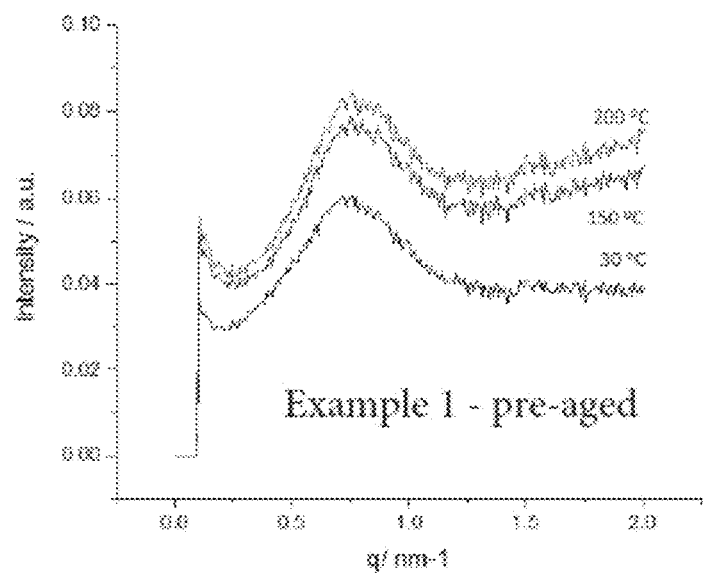
FIGS. 8A, 8B, and 8C show SAXS results collected at 30° C., 150° C., and 200° C. for Example 1, before and after aging, and Comparative Example 1, respectively.

FIG. 7 shows comparison of Small-Angle X-ray Scattering (SAXS) data for the TPVs of Example 1, before and after aging, and for Comparative Example 1. FIG. 8A shows SAXS data for the TPV of Example 1 before aging. FIG. 89 shows SAXS data for the TPV of Example 1 after aging. FIG. 8C shows SAXS data for the TPV of Comparative Example 1. SAXS aids in the understanding of crystallization effect, in particular in determining the crystal change of the TPVs of Example 1, before and after aging, and Comparative Example 1, according to temperature. The aged TPV of Example 1 as shown in FIG. 7 was aged at 150° C. for 2 minutes. By SAM, the polymer microstructure can be observed within hundredths of nanometers, and correlation functions can be used to calculate the long period (total thickness of crystal phase and amorphous phase); as well as the crystalline and amorphous regions' thickness in the aged TPV.

The data shown in FIG. 7 was collected at room temperature, the Y axis is intensity (unitless), and the X axis is scattering vector (nm-1). The intensity is an arbitrary unit, and therefore it is useful in comparing intensity across different values of scattering vector, and comparing intensity of one sample to another for a given scattering vector. Relative to Comparative Example 1, a clear and sharp peak for Example 1 both before and after aging is observed, which means there are ordered structures in the TPV of Example 1 before and after aging, more so in the aged TPV of Example 1. This may be because the PBE and the thermoplastic resin of Example 1 allows for easy crystallization of the thermoplastic component of the TPV.

Figure 8B:
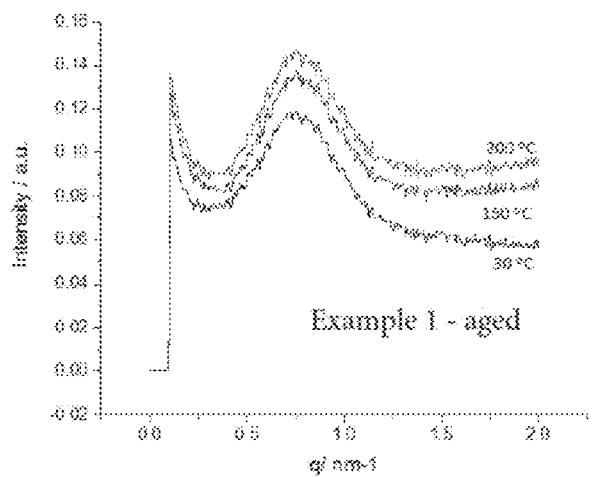
Figure 8C:
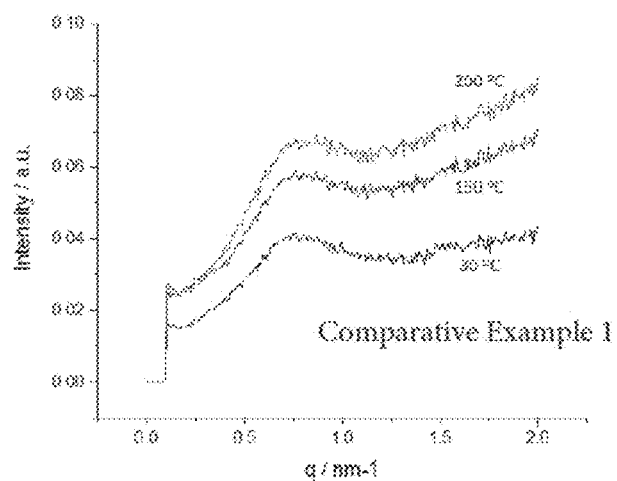
Figure 9:
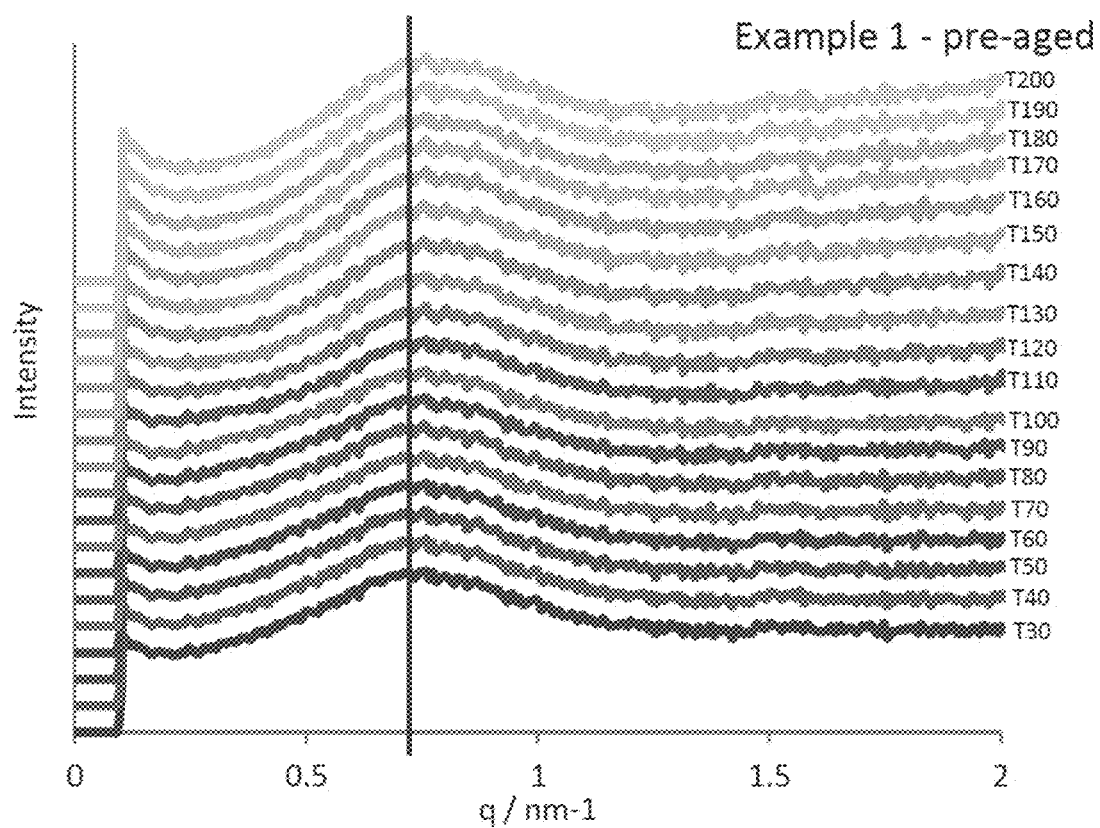
FIG. 9 shows SAXS results for every 10° C. between 30° C. and 200° C. for pre-aged TPV of Example 1.

FIGS. 8A, 8B, and 8C show SAXS results collected at 30° C., 150° C., and 200° C., respectively, for Example 1, before and after aging, and for Comparative Example 1. FIG. 9 shows SAXS results for every 10° C. between 30° C. and 200° C. for pre-aged TPV of Example 1 (labeled in FIG. 9 as T30 for 30° C.; T40 for 40° C., and so on).

As shown in FIG. 8C, Comparative Example 1 is quite stable along temperature such that the peaks of thermoplastic component crystallization remain at the same position and same intensity among the different temperatures. The peaks of the TPV of Comparative Example 1 in FIG. 8C are relatively broad, which means the material is less crystallized. In FIG. 8B, the aged TPV of Example 1 is very stable from room temperature to 200° C. such that the peak position and intensity is same among the different temperatures. As shown in FIG. 8B, the peak is quite sharp such that ordered structures are indicated. However, the pre-aging TPV of Example 1 shows different behavior from the aged TPV of Example 1 in that the peaks shift to the right and sharpen with increased temperature.

As shown in FIG. 9, the peak of the SAXS data of the pre-aged TPV of Example 1 begins to shift at about 60° C., which aligns with DSC and DMTA results. Comparing to FIG. 8A, for the pre-aged TPV of Example 1, the peaks at 150° C. and 200° C. stay at the same position, which is to the right of the peak at 30° C. Also, the peaks are sharper and stronger at 150° C. and 200° C. compared to 30° C. for the pre-aged TPV of Example 1. This phenomenon could be explained by the melting of the PBE-thermoplastic resin matrix, thus the molecules move into an ordered position. Also, as the temperature increases, some small lamellae begin melting first before larger lamellae, thus the SAXS peak shifts to the right and gets stronger. As temperature rises to more than 150° C., the structure is quite stable, which is also aligned with DMTA results. As the sample is thick for a SAXS test, the inner material could remain at a lower temperature as a solid phase, which gives the signal at the temperature higher than melting point. Easy movement of molecules could cause the size deformation. Additionally or alternatively, the shifting of the peaks of the pre-aged TPV of Example 1 may be caused by the completion of curing of the rubber component of the TPV of Example 1.

Figure 10:
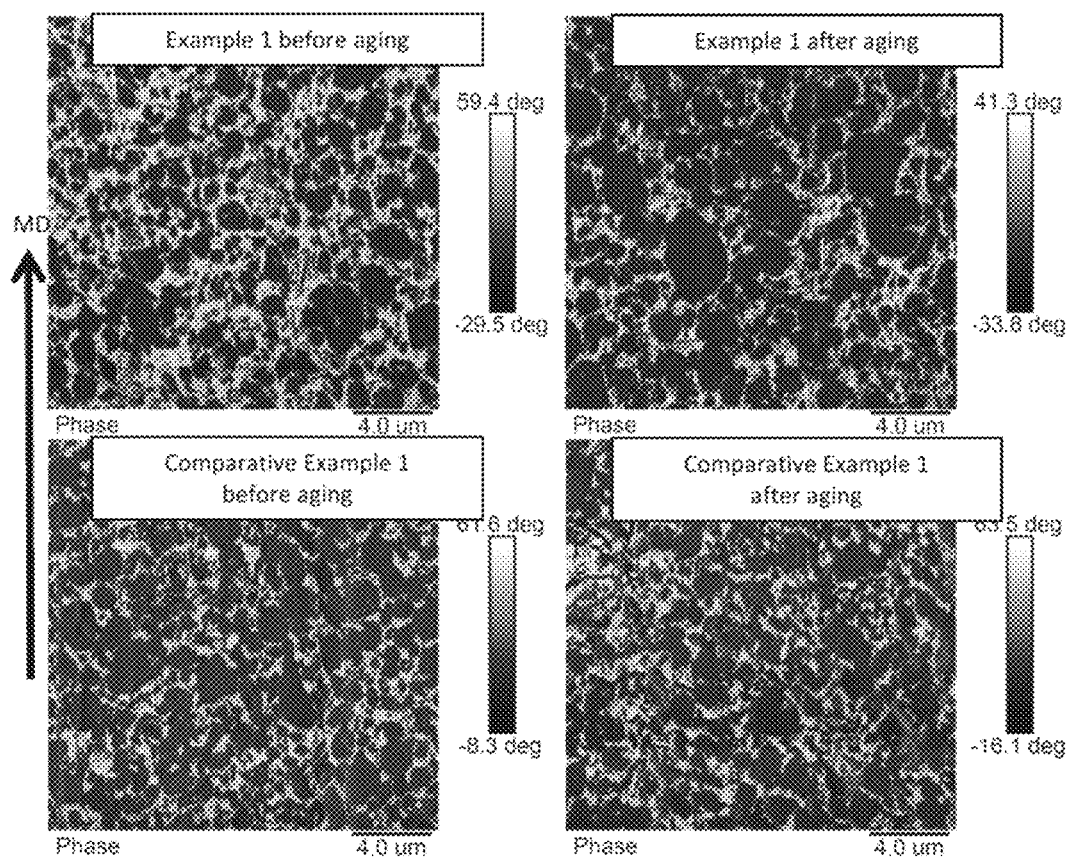
FIG. 10 shows atomic force microscopy (AFM) data for TPVs for Example 1 and Comparative Example 1 before and after aging.
Figure 11:
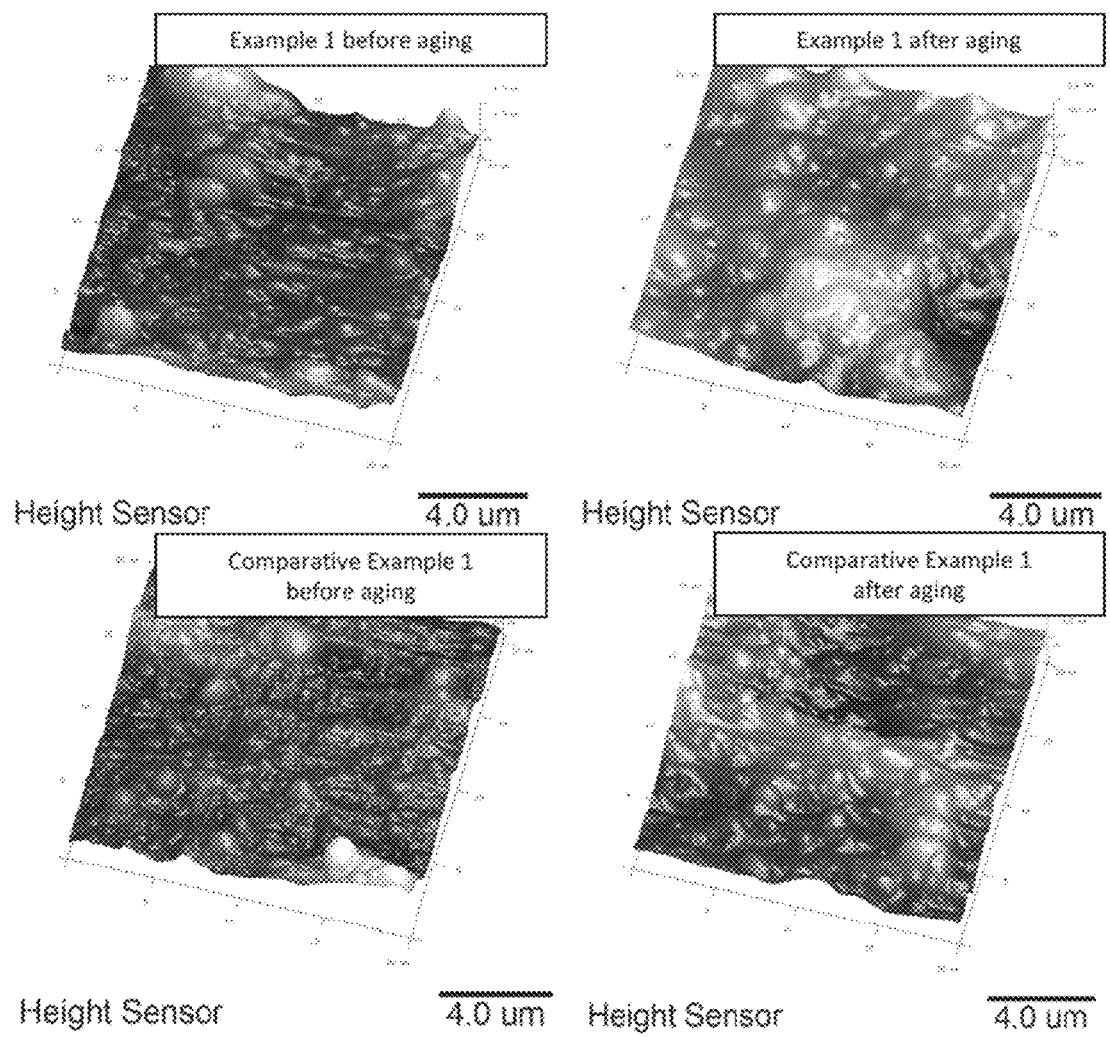
FIG. 11 shows AFM data of surfaces of TPVs for Example 1 and Comparative Example 1 before and after aging.

FIG. 10 shows atomic force microscopy (AFM) data for TPVs for Example 1 and Comparative Example 1 before and after aging. FIG. 11 shows AFM data of surfaces of TPVs for Example 1 and Comparative Example 1 before and after aging. From the AFM results of FIG. 10 and FIG. 11, Comparative Example 1 has limited morphology changes after aging at 150° C. for 2 min. The rubber particles elongated along MD because of shear during the injection molding process. After aging, the particles maintain similar size for Comparative Example 1. For Example 1, the pre-aged rubber particle size is quite small and dispersed well in the PBE-thermoplastic matrix. However, the rubber particles agglomerate after aging at 150° C. This could be explained as the PBE-thermoplastic matrix may not have enough strength to maintain the positions of the rubber particles at high temperatures because the PBE-thermoplastic matrix begins melting from 60° C. From low temperature, PBE-thermoplastic matrix starts to move to form an ordered structure. Thus, the rubber particles are released and can agglomerate. As the surface energy of rubber particles is similar, they tend to agglomerate and form bigger particles. Moreover, the rubber particles are sheared and elongated by shear during injection molding, but this stress gets released when the PBE-thermoplastic matrix gets weaker. The shear effect is generally visible at a surface of a material.

AFM on the surface was conducted for Example 1 and Comparative Example 1 before and after aging, as shown in FIG. 11. The results shown in FIG. 11 confirm the results from cross section AFM, shown in FIG. 10, that the rubber particles agglomerate into bigger size particles. Alternatively or additionally, the heat aging process further cures or completes curing of the rubber component of the TPV of Example 1 as potentially indicated by the agglomeration of the rubber particles as shown in FIGS. 10 and 11, whereas Comparative Example 1 is fully cured before aging.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

All patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A process of heat shrinking an article, the process comprising:
    shaping a thermoplastic vulcanizate (TPV) into an article, the TPV comprising:
        a partially vulcanized rubber dispersed in a continuous thermoplastic phase,
        wherein more than 5 wt % of the rubber is extractable in boiling xylene, and
            wherein the thermoplastic phase comprises a thermoplastic resin having a Tm>110° C. and a propylene-based elastomer (PBE) having a Tm<110° C.; and
    heating the article to a temperature between about 100° C. and 250° C. to shrink the article.

2. A process of heat shrinking an article, the method comprising:
    shaping a thermoplastic vulcanizate (TPV) into an article, the TPV comprising:
        an at least partially vulcanized rubber dispersed in a continuous thermoplastic phase,
        wherein the thermoplastic phase comprises a thermoplastic resin having a Tm>110° C. and a propylene-based elastomer (PBE) having a TM<110° C.; and
    heating the article to a temperature between about 100° C. and 250° C. to shrink the article.

3. A process according to claim 1, wherein the heating shrinks the article in a machine direction (MD) by at least 20%.

4. A process according to claim 3, wherein the article is a tube, and the MD is an axial direction of the tube.

5. A process according to claim 1, wherein the heating shrinks the article in a cross direction (CD) by no more than 5%.

6. A process according to claim 5, wherein the article is a tube, and the cross direction is a radial or circumferential direction of the tube.

7. A process according to claim 1, wherein the thermoplastic resin has a Tm>130° C.

8. A process according to claim 1, wherein the PBE has a Tm<100° C., and further wherein the PBE comprises 70 to 95 wt % units derived from propylene and 5 to 30 wt % units derived from ethylene, said wt % s on the basis of the monomer-derived content of the PBE.

9. The process according to claim 1, wherein heating the article comprises heating the article to a temperature between about 110° C. and 150° C.

10. A process according to claim 1, wherein the heating the article comprises heating the article to the temperature for 120 seconds.

11. A process according to claim 1, wherein more than 10 wt % of the rubber is extractable in boiling xylene.

12. A process according to claim 1, wherein more than 15 wt % of the rubber is extractable in boiling xylene.

13. A process according to claim 1, wherein the shaping comprises molding or extruding the TPV.

14. A process of securing two parts by heat shrinking an article, the process comprising:
    disposing the article at least partially about each of the two parts to be secured, and heating the article to a temperature between 100° C. and 250° C. so as to shrink the article, thereby securing the two parts;
    wherein the article comprises a TPV, the TPV comprising:
    a partially vulcanized rubber dispersed in a continuous thermoplastic phase,
    wherein more than 5 wt % of the rubber is extractable in boiling xylene, and
        wherein the thermoplastic phase comprises a thermoplastic resin having a Tm>110° C. and a propylene-based elastomer (PBE) having a Tm<110° C.

15. A process according to claim 1, wherein the thermoplastic resin comprises a random propylene, ethylene, butene terpolymer.

16. A process according to claim 1, wherein the rubber is an ethylene propylene diene rubber (EPDM).

* * * * *